US006542171B1

United States Patent
Satou et al.

(10) Patent No.: US 6,542,171 B1
(45) Date of Patent: Apr. 1, 2003

(54) SCHEME FOR GRAPHICAL USER INTERFACE USING POLYGONAL-SHAPED SLIDER

(75) Inventors: Takashi Satou, Yokosuka (JP); Haruhiko Kojima, Yokohama (JP); Yoshinobu Tonomura, Yokohama (JP); Akihito Akutsu, Yokohama (JP)

(73) Assignee: Nippon Telegraph amd Telephone Corporation, Tokyo (JP)

( * ) Notice: Subject to any disclaimer, the term of this patent is extended or adjusted under 35 U.S.C. 154(b) by 0 days.

(21) Appl. No.: 09/348,847

(22) Filed: Jul. 7, 1999

(30) Foreign Application Priority Data

Dec. 7, 1998 (JP) .............................. 10-346380
Jul. 8, 1998 (JP) .............................. 10-192594

(51) Int. Cl.⁷ .............................. G09G 5/00; A63F 13/00
(52) U.S. Cl. .................. 345/833; 345/704; 345/723; 463/30; 463/31
(58) Field of Search .................. 345/676, 679–680, 345/688, 473–475, 704, 711, 723, 810, 833, 974; 463/30–31

(56) References Cited

U.S. PATENT DOCUMENTS 5,680,525 A * 10/1997 Sakai et al. ................. 345/585
5,844,567 A * 12/1998 Gossett et al. .............. 345/586
5,903,264 A * 5/1999 Moeller et al. ............. 345/974
6,057,833 A * 5/2000 Heidmann et al. .......... 345/425
6,115,037 A * 9/2000 Sumiyoshi et al. ......... 345/726
6,228,704 B1 * 5/2001 Uchida ....................... 438/220

* cited by examiner

Primary Examiner—Matthew C. Bella
Assistant Examiner—Anthony Blackman
(74) Attorney, Agent, or Firm—Kilpatrick Stockton LLP

(57) ABSTRACT

A scheme for graphical user interface using a polygonal-line-shaped slider that enables a user to intuitively manipulate-and playback spatio-temporal media data such as video data and animation data without deteriorating the temporal continuity of the data in interactive manipulation and playback of the spatio-temporal media data is disclosed. In this scheme, the slider is composed of a polygonal line composed of at least one segment and a coordinate indicator that is moved along the polygonal line. Data corresponding to coordinates specified by the coordinate indicator is entered. The apparatus according to present invention stores the coordinates of vertexes of the polygonal line, stores input coordinates, maps the input coordinates onto a point on the polygonal line, and positions the coordinate indicator at the point.

61 Claims, 36 Drawing Sheets

| POLYGONAL LINE NUMBER | VERTEX NUMBER | X-COORDINATE | Y-COORDINATE |
|---|---|---|---|
| 1 | 1 | 20 | 30 |
| 1 | 2 | 50 | 30 |
| 1 | 3 | 80 | 50 |
| ... | ... | ... | ... |
| 2 | 1 | 10 | 20 |
| ... | ... | ... | ... |

FIG.28

| POLYGONAL LINE NUMBER | VERTEX NUMBER | X-COORDINATE | Y-COORDINATE | VERTEX VALUE |
|---|---|---|---|---|
| 1 | 1 | 20 | 30 | 0 |
| 1 | 2 | 50 | 30 | 10 |
| 1 | 3 | 80 | 50 | 20 |
| ... | ... | ... | ... | ... |
| 2 | 1 | 10 | 20 | 0 |
| ... | ... | ... | ... | ... |

| POLYGONAL LINE NUMBER | VERTEX NUMBER | X-COORDINATE | Y-COORDINATE | FLAG |
|---|---|---|---|---|
| 1 | 1 | 20 | 30 | — |
| 1 | 2 | 50 | 30 | YES |
| 1 | 3 | 80 | 50 | NO |
| ... | ... | ... | ... | ... |
| 2 | 1 | 10 | 20 | NO |
| ... | ... | ... | ... | ... |

FIG.48
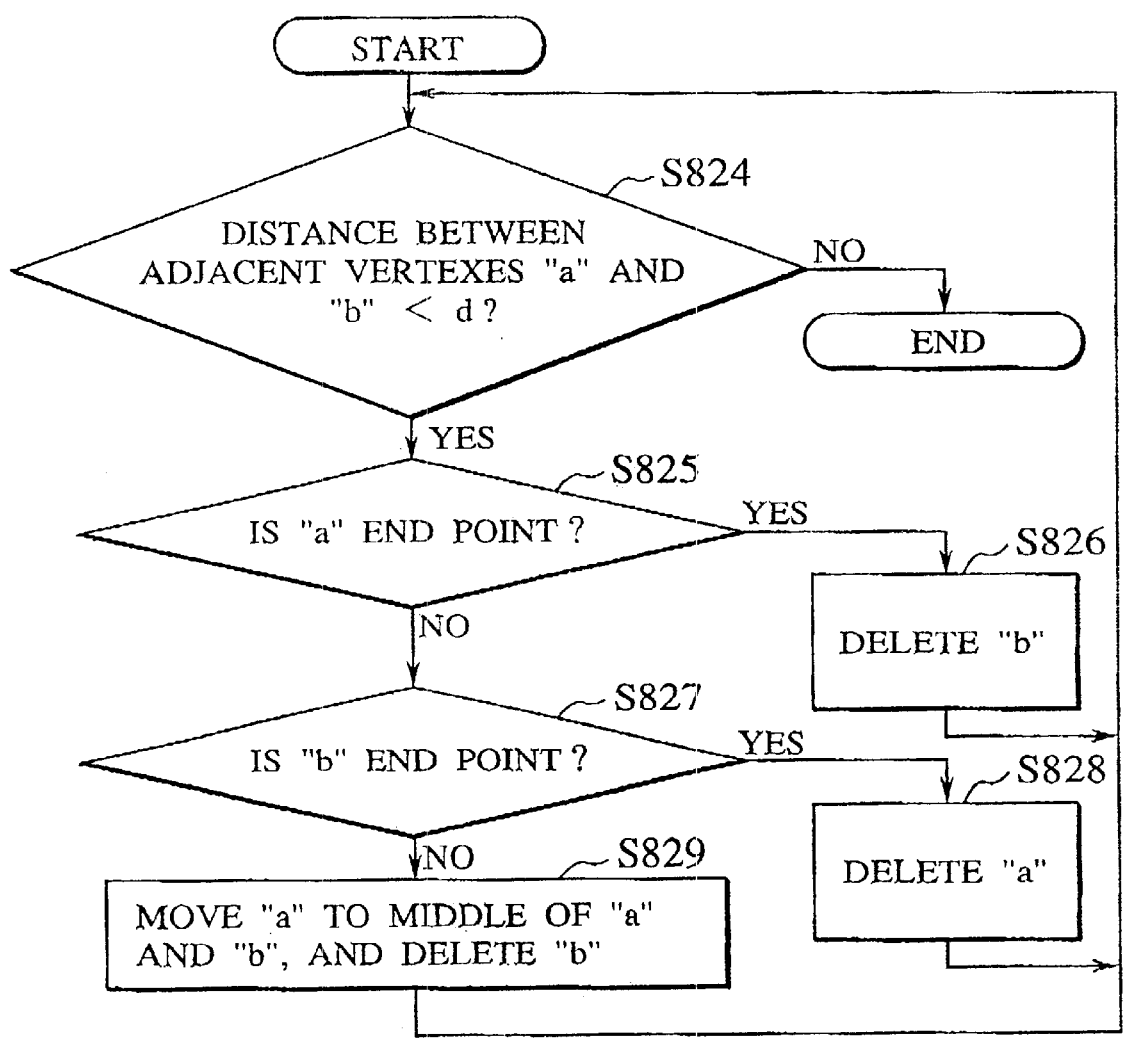

DISPLAY

DISPLAY

SCHEME FOR GRAPHICAL USER INTERFACE USING POLYGONAL-SHAPED SLIDER

BACKGROUND OF THE INVENTION

1. Field of the Invention

The present invention relates to a scheme for GUI (graphical user interface) using a polygonal-line-shaped slider that serves as an interface for enabling a user to intuitively manipulate and playback spatio-temporal media data such as video data and animation data continuously in time in correspondence to user input with respect to interactive manipulation and playback of the spatio-temporal media data.

2. Description of the Background Art

One of conventional interfaces for interactively manipulating data is a slider. FIG. 1 shows one conventional slider. The slider comprises a segment having a start point 91 and an end point 93, and a thumb 92, where the thumb 92 moves along the segment. A user uses a pointing device such as a mouse or a touch panel to manipulate the thumb 92. A value between the start point 91 and the end point 93 is set in accordance with the movement of the thumb 92. The value corresponding to the position of the thumb 92 is entered into a personal computer. In FIG. 1, the thumb 92 can be moved between a value 0 assigned to the start point 91 and a value 100 assigned to the end point 93 and is presently positioned at a value 45.

The slider is usually displayed at a lower part of a monitor screen and serves as a cursor (anchor) moving along a time axis. The slider is used to indicate the relative position of a currently playbacked image frame and functions as an interface for realizing variable-speed playback of video data such as random playback, fast forward, and reverse mode. A technique of employing a slider to interactively manipulate data is disclosed in "A Magnifier Tool for Video Data" by M. Mills et al., CHI '92 (Human factors in computing systems), pp. 93 to 98, 1992.

The conventional slider may continuously manipulate image frames of video data according to the movements of the thumb. This conventional slider, however, linearly projects the time axis of video data onto the slider regardless of the contents of the video data such as the movements of an object contained in the video data. Therefore, the manipulation of the slider does not always agree with playbacked video data intuitively. For example, an object in playbacked video data may move to the left although the thumb of the slider is moved to the right. The conventional slider is unable to continuously follow the complicated trajectory of moving objects, waveforms, or routes in maps while inputting continuous values, because the conventional slider is incapable of spatially relating the video data to the slider, so that video data manipulation is difficult.

Another conventional technique for interactive manipulation of video data is disclosed in U.S. patent application Ser. No. 09/099,189. This technique employs a function for mapping input X-Y coordinates to frame numbers of the images with regard to an object moving along a trajectory that can be linearly mapped. The function is used to playback a frame image corresponding to input coordinates. This technique, however, is also unable to manipulate video data that involve an complicated trajectory.

SUMMARY OF THE INVENTION

An object of the present invention is to provide a scheme for GUI (Graphical User Interface) using a polygonal-line-shaped slider that enables a user to intuitively manipulate and playback spatio-temporal media data such as video data and animation data without deteriorating the temporal continuity of the data in interactive manipulation and playback of the spatio-temporal media data.

Another object of the present invention is to resolve the difficulty of manipulation due to the polygonal line shape of the slider, and to improve the handling of the polygonal-line-shaped slider by properly adjusting the position of the thumb of the slider to input coordinates even if user is incapable of tracing the polygonal line or the thumb of the polygonal-line-shaped slider.

In order to accomplish the above objects, an aspect of the present invention provides a method of entering data corresponding to specified coordinates. The method includes the steps of (a) storing coordinates of vertexes which define a polygonal line shaped slider that is composed of a polygonal line formed by at least one segment and a coordinates indicator to be moved along the polygonal line, (b) storing input coordinates, and (c) mapping the input coordinates onto a point on the polygonal line and positioning the coordinate indicator at the point.

Another aspect of the present invention provides a method of interactively manipulating video data. The method includes the steps of (l) sliding a coordinate indicator along a polygonal line formed by at least one segment using a polygonal line shaped slider composed of the polygonal line and the coordinate indicator according to input coordinates, and (m) presenting the video data of an image frame corresponding to the position of the slid coordinates indicator.

Still another aspect of the present invention provides an apparatus for entering data corresponding to specified coordinates. The apparatus has (a) a unit for storing coordinates of vertexes which define a polygonal line shaped slider that is composed of a polygonal line formed by at least one segment and a coordinates indicator to be moved along the polygonal line, (b) a unit for storing input coordinates, and (c) a unit for mapping the input coordinates onto a point on the polygonal line and positioning the coordinate indicator at the point.

Still another aspect of the present invention provides an apparatus for interactively manipulating video data. The apparatus has (l) a unit for receiving input coordinates, (m) a unit for sliding a coordinate indicator along a polygonal line formed by at least one segment using a polygonal line shaped slider composed of the polygonal line and the coordinate indicator according to the input coordinates, and (n) a unit for presenting the video data of an image frame corresponding to the position of the slid coordinate indicator.

Still another aspect of the present invention provides a computer readable recording medium for causing the computer to execute processing for entering data corresponding to specified coordinates, the processing including: (a) a process for storing coordinates of vertexes which define a polygonal line shaped slider that is composed of a polygonal line formed by at least one segment and a coordinate indicator to be moved along the polygonal line, (b) a process for storing Input coordinates, and (c) a process for mapping the input coordinates onto a point on the polygonal line and positioning the coordinate indicator at the point.

Still another aspect of the present invention provides a computer readable recording medium for causing the computer to execute processing for interactively manipulating video data, the processing including: (l) a process for sliding a coordinate indicator along a polygonal line formed by at least one segment using a polygonal line shaped slider composed of the polygonal line and the coordinate indicator according to input coordinates and (m) a process for presenting the video data of an image frame corresponding to the position of the slid coordinate indicator.

Other features and advantages of the present invention will become apparent from the following description taken in conjunction with the accompanying drawings.

BRIEF DESCRIPTION OF THE DRAWINGS

FIG. 28 is a diagram showing vertex data stored in a vertex storage unit according to the fifth embodiment;

FIG. 48 is a flow chart showing a vertex merging processing carried out by a modification of polygonal line correction unit according to the tenth embodiment;

DETAILED DESCRIPTION OF THE EMBODIMENTS

Now, the scheme for GUI (Graphical User Interface) using polygonal-line-shaped slider of the present invention will be explained in detail with reference to the drawings.

First, an outline of the polygonal-line-shaped slider of the present invention will be explained.

Figure 1:
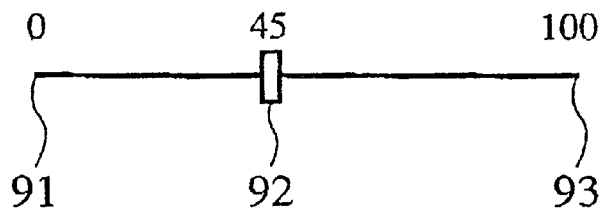
FIG. 1 is a diagram view showing a conventional slider.
Figure 2:
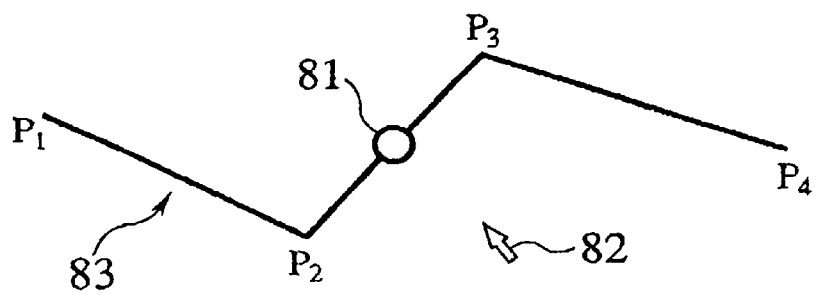
FIG. 2 is a diagram showing a polygonal-line-shaped slider according to the present invention.

FIG. 2 shows a polygonal-line-shaped slider according to the present invention.

The polygonal-line-shaped slider comprises a polygonal line 83 defined by vertexes P1, P2, P3, and P4, and a thumb 81 to be moved along the polygonal line 83. The polygonal line 83 is composed of one segment or plural segments. A cursor 82 is positioned at coordinates that are specified by a user using a coordinate input device. The user moves the cursor 82 around the polygonal line 83 or the thumb 81 in order to move the thumb 81 along the polygonal line 83.

The polygonal line 83 can be generated by approximating temporal changes in video data, the camera movements, or a trajectory of a moving object in video data. Since the slider is composed of the polygonal line, it can follow a complicated trajectory traced by a moving object contained in video data. The polygonal-line-shaped slider is arranged over spatio-temporal media data such as video data displayed on a monitor screen so that the polygonal-line-shaped slider may serve as an anchor to manipulate the spatio-temporal data. For example, a polygonal line approximating the trajectory of a ball in video data is arranged over a display screen where the video data is displayed, and values set along the polygonal line are related to frame numbers (time axis) of the video data to be playbacked. The user employs a pointing device such as a mouse to move (slide) the thumb along the polygonal line, so that the user can obtain an arbitrary image whose frame number corresponds to the coordinates of the thumb on the polygonal line. Since the polygonal-line-shaped slider is temporally and spatially synchronized with the video data, the user can intuitively and continuously manipulate and playback the video data as if the user is grabbing and-moving the ball.

It is relatively difficult for the user to correctly trace points along the polygonal line 83. Accordingly, the polygonal-line-shaped slider of the present invention sets an allowable range of input coordinates for moving the thumb 81. Even if the cursor 82 is not on the polygonal line 83 or the thumb 81, the polygonal-line-shaped slider of the present invention smoothly maps input coordinates provided by the cursor 82 that is manipulated by the user to the movement of the thumb 81 so that the thumb 81 is properly positioned on the polygonal line 83 according to the user's manipulation of the cursor 82. The input coordinates are mapped onto a point on the polygonal line by being projected on the polygonal line in various way.

FIRST EMBODIMENT

Referring now to FIG. 2 to FIG. 10, the first embodiment of the GUI scheme using a polygonal-line-shaped slider according to the present invention will be described in detail. The first embodiment enables a user to interactively manipulate and playback spatio-temporal data such as video data using the above polygonal-line-shaped slider that flexibly relates the time and space axes to a two-dimensional display screen.

Figure 3:
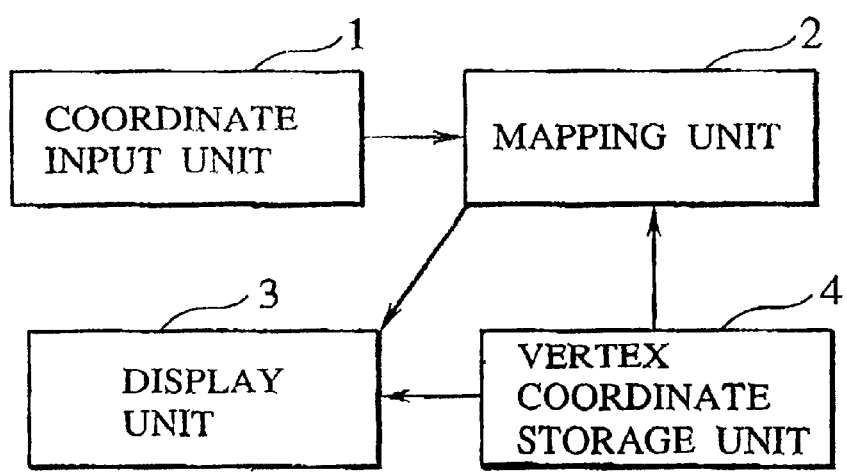
FIG. 3 is a block diagram showing a polygonal-line-shaped slider apparatus according to the first embodiment of the present invention.

FIG. 3 shows a basic configuration of the polygonal-line-shaped slider apparatus of the first embodiment. The apparatus comprises a coordinate input unit 1, a mapping unit 2, a display unit 3, and a vertex storage unit 4.

Figures 4, 5:
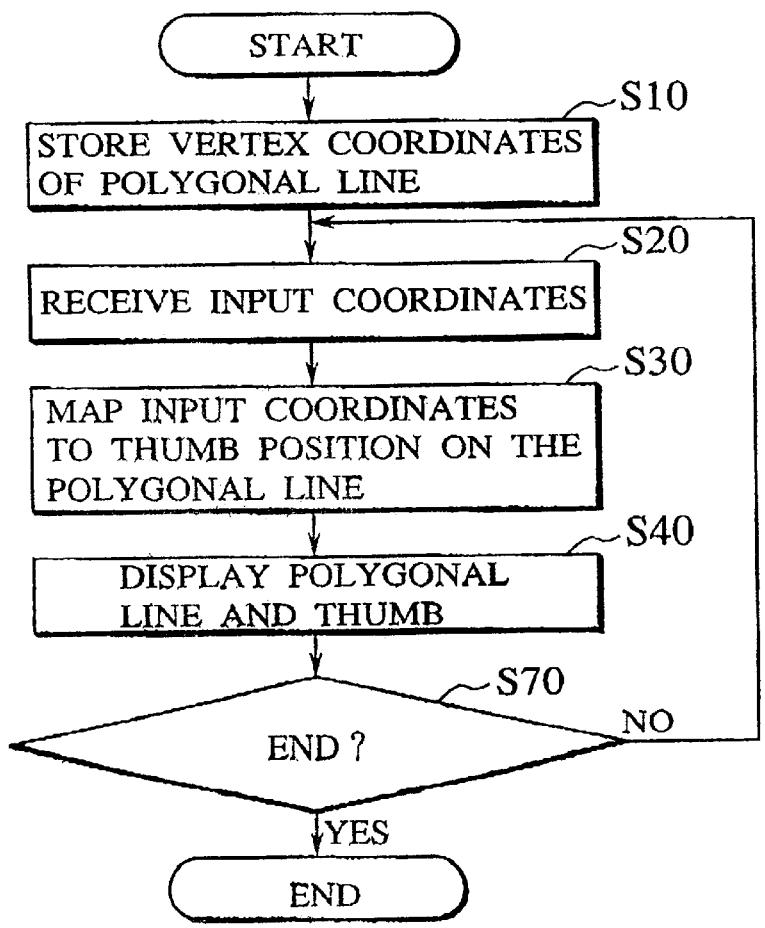
FIG. 4 is a diagram showing exemplary vertex data stored in a vertex storage unit of the apparatus according to the first embodiment.
FIG. 5 is a flow chart showing a processing carried out by the apparatus according to the first embodiment.

The coordinate input unit 1 is implemented as a pointing device such as a mouse or a touch panel and used to enter input coordinates into the mapping unit 2 so as to store the input coordinates. The mapping unit 2 maps the input coordinates provided by the coordinate input unit 1 to a position of the thumb 81 of the polygonal-line-shaped slider of FIG. 2. The display unit 3 displays the slider composed of the thumb 81 and the polygonal line 83 on a display device such as a CRT or an LCD (shown in FIGS. 55A and 55B) such that the thumb 81 appears at a position mapped by the mapping unit 2 on the polygonal line 83. Note that if it is not required to display the slider, the display unit 3 may be omitted. The vertex storage unit 4 stores the X- and Y-coordinates of each vertex of the polygonal line in a semiconductor memory or a magnetic disk, for example. The coordinates of vertexes stored in the vertex storage unit 4 define the shape of the polygonal line 83. FIG. 4 shows an exemplary vertex data stored in the vertex storage unit 4. The present coordinates of the thumb 81 may be stored in the vertex storage unit 4 together with or separately from the vertex data.

FIG. 5 shows a flow chart for a procedure of the processing carried out by the polygonal-line-shaped apparatus according to the first embodiment. First, the vertex storage unit 4 stores coordinates of each vertex of the polygonal line (step S10). The coordinate input unit 1 receives coordinates input by a user (step S20). The mapping unit 4 maps the input coordinates to a position of the thumb 81 that is moved along the polygonal line (step S30). The display unit 3 displays the polygonal line 83 and the thumb 81 on a display screen (step S40). Steps S20 to S40 are repeated until the user completes a series of processing such as the manipulation of video data (step S70).

Next, the processing carried out by the mapping unit 2 according to the first embodiment will be described in detail.

Figure 6:
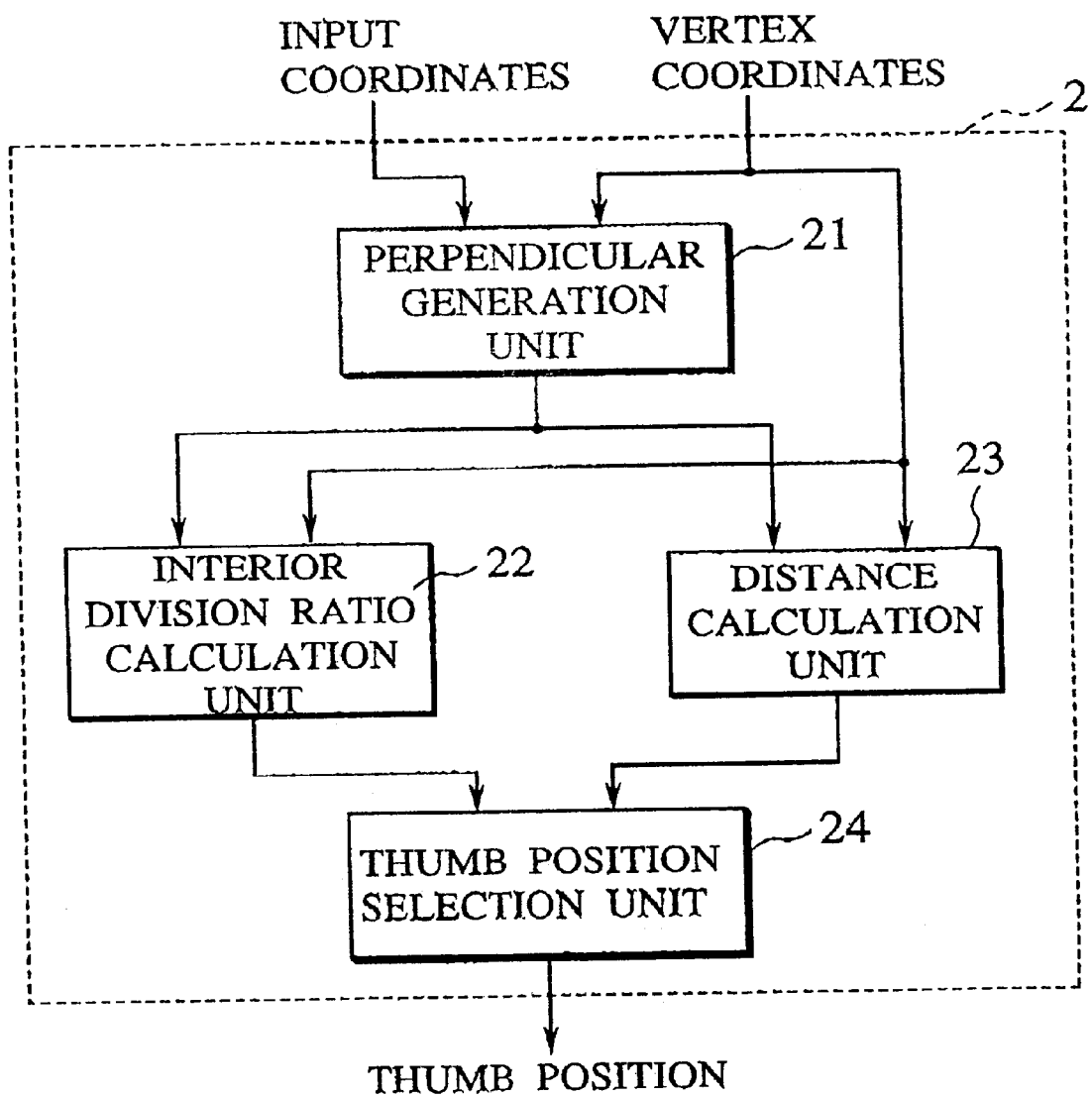
FIG. 6 Is a block diagram showing a detailed configuration of a mapping unit of the apparatus according to the first embodiment.
Figure 7:
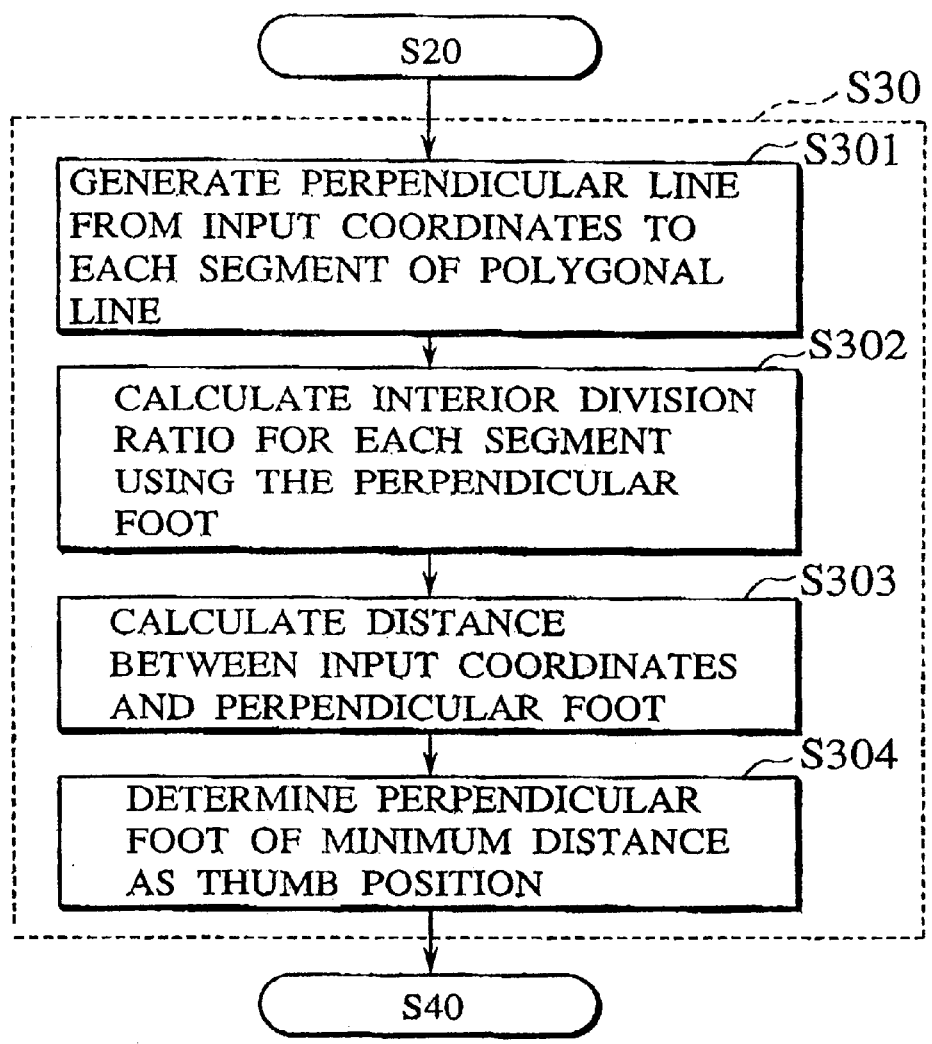
FIG. 7 is a flow chart showing a processing carried out in step S30 of FIG. 5 according to the first embodiment.

FIG. 6 shows a detail configuration of the mapping unit 2 and FIG. 7 shows a flow chart for a procedure of the processing carried out by the mapping unit 2. The mapping unit 2 according to the first embodiment comprises a perpendicular generation unit 21, an interior division ratio calculation unit 22, a distance calculation unit 23, and a thumb position selection unit 24, and determines the position of the thumb on the polygonal line according to input coordinates from the coordinate input unit 1 and vertex coordinates from the vertex storage unit 4.

As shown in FIG. 7, the perpendicular generation unit 21 generates perpendicular lines extended from input coordinates provided by the coordinate input unit 1 to segments that form the polygonal line (step S301). This will be explained in detail with reference to FIG. 8. A polygonal line ABCD (corresponding to the polygonal line 83 of FIG. 2) is composed of segments AB, BC, and CD. When the user specifies a point I with the pointing device, the perpendicular generation unit 21 generates perpendicular lines from the point I to the segments AB, BC, and CD or the extensions thereof, to form intersection points E, F, and G. Hereinafter, an intersection point of a segment and a generated perpendicular line is called a "foot."

Figure 8:
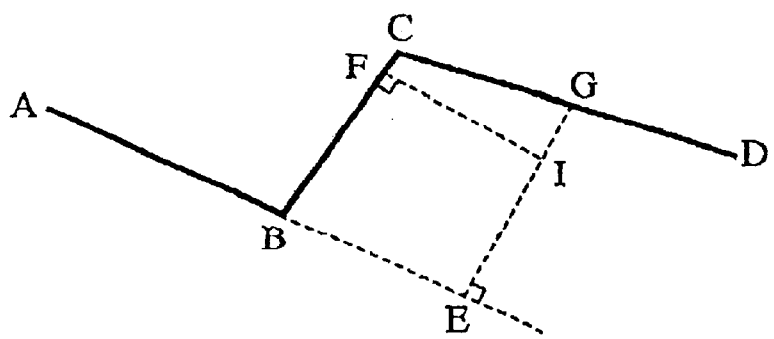
FIG. 8 is a diagram showing a technique for finding a ratio according to the first embodiment.

The interior division ratio calculation unit 22 calculates, for each segment, a ratio of a partial length divided by the corresponding foot with respect to the length of the segment. In FIG. 8, the interior division ratio calculation unit 22 calculates ratios AE/(AE−EB), BF/(BF+FC), and CG/(CG+GD). Any ratio that is in the range of 0 to 1 indicates that the corresponding foot is inside the corresponding segment. That is, in FIG. 8, it can be seen that the foot E of FIG. 8 is outside the segment AB.

The distance calculation unit 23 calculates a distance between the input coordinates and each foot (step S303). In FIG. 8, the distance calculation unit 23 calculates distances IE, IF, and IG.

The thumb position selection unit 24 selects a foot that is nearest to the input coordinates from among the feet that are inside the corresponding segments so as to determine the selected foot as the position of the thumb (step S304). In FIG. 8, the foot E is excluded because it is outside the corresponding segment, and the nearest foot G is selected as the position of the thumb by comparing the distances IF and IG.

Figure 9:
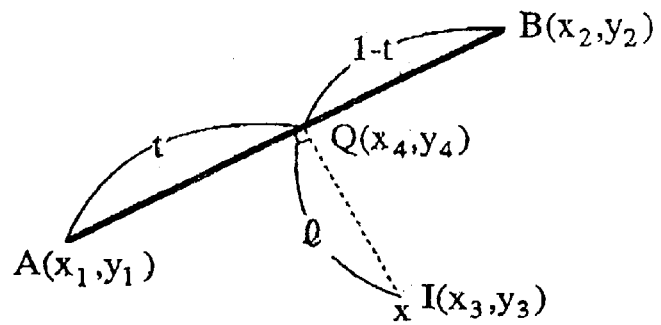
FIG. 9 is a diagram showing a technique for finding the coordinates of a perpendicular foot, an interior division ratio, and a distance according to the first embodiment.

FIG. 9 shows a technique for calculating coordinates, an interior division ratio, and a distance for the foot of a perpendicular line.

A segment AB extends between a point $A(x_1, Y_1)$ and a point $B(x_2, y_2)$. A point $I(x_3, y_3)$ is entered by a user and a perpendicular line IQ is drawn from the point I to the segment AB. Here, a point $Q(x_4, y_4)$ on the segment AB is the foot of the perpendicular line IQ. The foot Q internally divides the segment AB at a ratio of t:1-t, where t is expressed as follows:

$$t=((x_1-x_2)(x_1-x_3)+(y_1-y_2)(y_1-y_3))/((x_1-x_2)^2+(y_1-y_2)^2) \quad (1)$$

Note that t is referred to as an interior division ratio hereinafter as shown in FIG.9.

If $0 \leq t \leq 1$, it is determined that the foot Q is inside the segment AB.

The coordinates of the foot $Q(x_4, y_4)$ are expressed in terms of t as follows:

$$\begin{pmatrix} x_4 \\ y_4 \end{pmatrix} = (1-t)\begin{pmatrix} x_1 \\ y_1 \end{pmatrix} + t\begin{pmatrix} x_2 \\ y_2 \end{pmatrix} \quad (2)$$

The distance l between the point I and the segment AB is expressed as follows:

$$l=|(y_2-y_1)(x_1-x_3)+(x_1-x_2)(y_1-y_3)|/\sqrt{((x_1-x_2)^2+(y_1-y_2)^2)} \quad (3)$$

In this way, the mapping unit 2 can move the thumb along the polygonal line to a position nearest to the input coordinates even if the input coordinates are not on the polygonal line. The first embodiment can map the input coordinates to a position of the thumb 81 by a relatively simple configuration.

Figure 10:
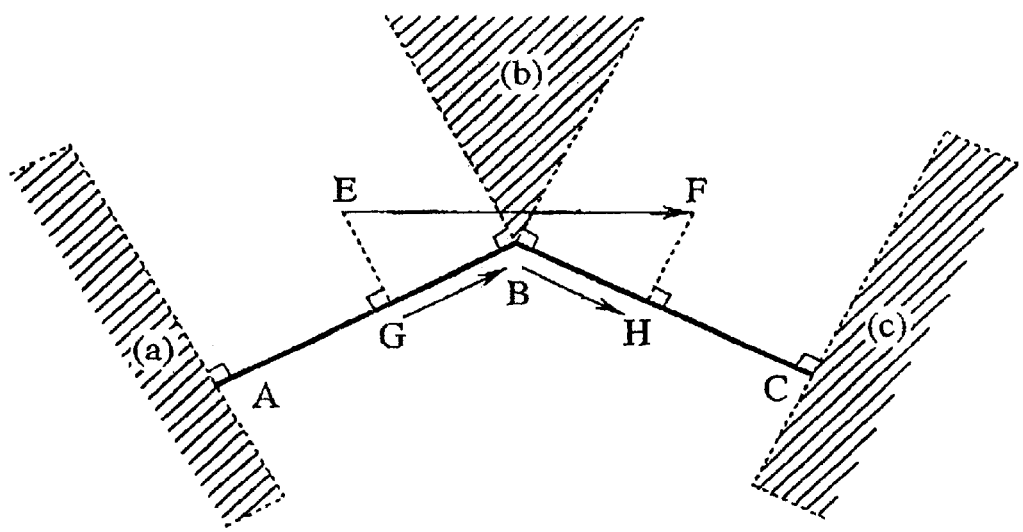
FIGS. 10 and 11 are diagrams showing relationships between input coordinates and a thumb according to the first embodiment.

If it is unable to set a foot of a perpendicular line on a segment of the polygonal line, a vertex of the polygonal line nearest to the input coordinates may be selected as the position of the thumb. This will now be explained in detail. FIG. 10 shows an exemplary relationship between a polygonal line ABC and the input coordinates. If the input coordinates are In any one of hatched areas (a), (b), and (c), it is impossible to draw a perpendicular line from the input coordinates to either one of segments AB and BC. Then, it is impossible to determine the position of the thumb on the polygonal line ABC. In this case, if the input coordinates are in the area (b), a vertex B is selected as the position of the thumb.

In this way, the first embodiment provides a polygonal-line-shaped slider for entering parameters according to the position of the thumb that is moved along the polygonal line and follow a complicated trajectory of a moving object contained in video data, so that the user can intuitively manipulate and display the object without deteriorating the temporal continuity. Also, the mapping unit 2 of the first embodiment properly maps the input coordinates to the position of the thumb so that the thumb can follow the input coordinates even if the input coordinates are not on the polygonal line.

SECOND EMBODIMENT

Referring now to FIG. 11 to FIG. 18, the second embodiment of the GUI scheme using a polygonal-line-shaped slider according to the present invention will be described in detail. The second embodiment improves the continuity of the movement of the thumb around vertexes of the polygonal line with respect to the movement of the input coordinates. The second embodiment is a modification of the first embodiment in which the mapping unit 2 of FIG. 6 of the first embodiment is replaced by a mapping unit 2 of FIG. 12.

In the first embodiment, there is a discontinuity in the movement of the thumb when input coordinates are around a vertex of the polygonal line. This will be explained in more detail. Assume that the input coordinates are continuously moved from a point E to a point F as shown: in FIG. 10. In this case, the thumb on the polygonal line ABC moves from a point G to a point H, and while the input coordinates are in the hatched area (b), the thumb stays at a vertex B. Accordingly, although the movement of the input coordinates from the point E to the point F is continuous, the movement of the thumb from the point G to the point H is discontinuous. Namely, the thumb continuously moves in a section CB, stays at the vertex B for a while, and then continuously moves in a section BH.

Figure 11:
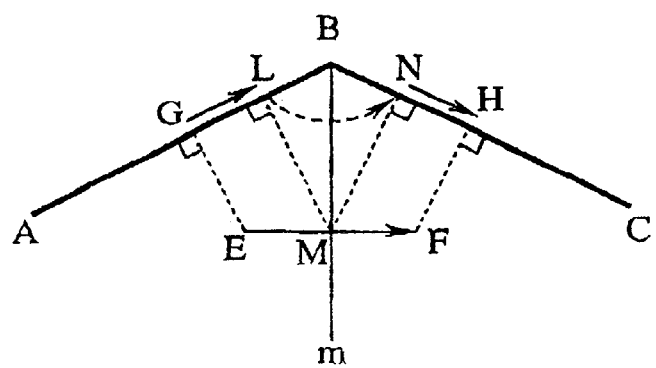

On.the other hand, as shown in FIG. 11, assume that the input coordinates are continuously moved from a point E to a point F, and the thumb on the polygonal line ABC moves from a point G to a point H. When the input coordinates cross a point M on a bisector line m of a vertex B, the thumb jumps from a point L to a point N. Accordingly, although the movement of the input coordinates is continuous, the movement of the thumb from the point G to the point H is discontinuous. More precisely, the thumb continuously moves in a section GL, jumps from the point L to the point N, and then continuously moves in a section NH.

Figure 12:
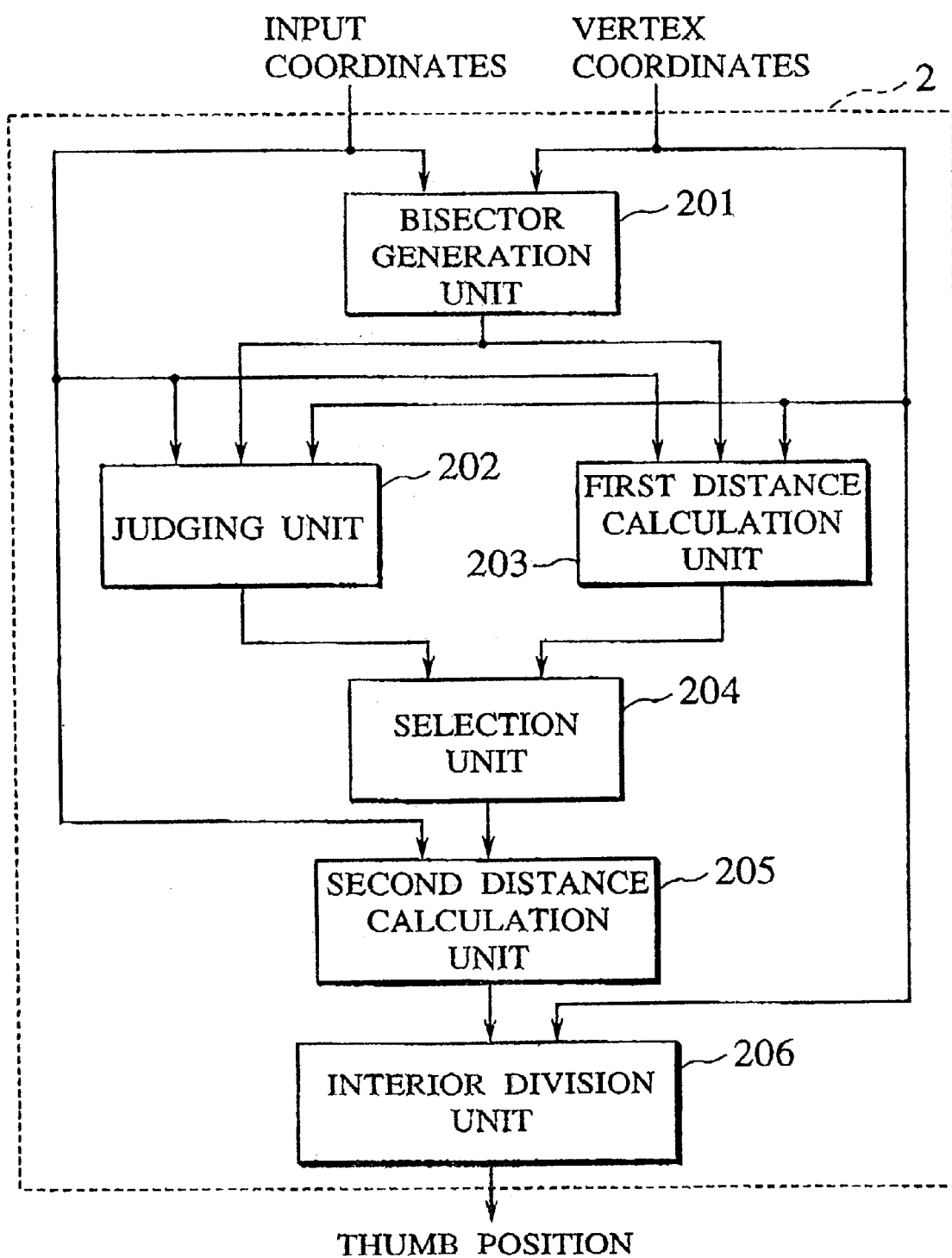
FIG. 12 is a block diagram showing a detailed configuration of a mapping unit according to the second embodiment of the present invention.

The second embodiment solves the discontinuity problem by using the mapping unit 2 of FIG. 12.

Next, the processing of the mapping unit 2 of the second embodiment will be explained in detail. FIG. 12 shows a detail configuration of the mapping unit 12 according to the second embodiment.

The mapping unit 2 of the second embodiment comprises a bisector generation unit 201, a judging unit 202, a first distance calculation unit 203, a selection unit 204, a second distance calculation unit 205, and an interior division unit 206. According to the input coordinates from the coordinate input unit 1 (FIG. 3) and the vertex coordinates from the vertex storage unit 4 (FIG. 3), the mapping unit 2 determines the position of the thumb on the polygonal line.

Figure 13:
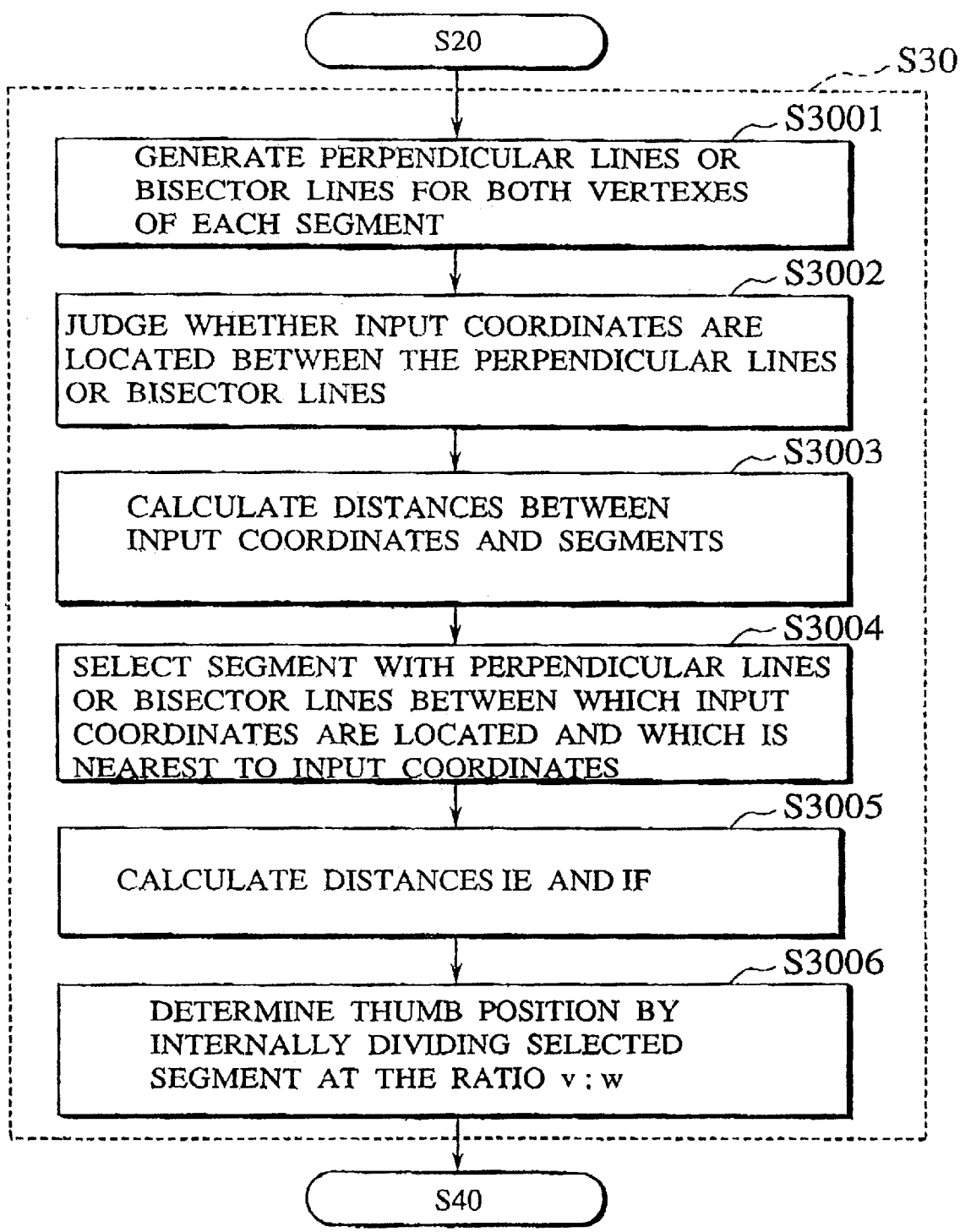
FIG. 13 is a flow chart showing a processing carried out in step S30 of FIG. 5 according to the second embodiment.
Figure 14:
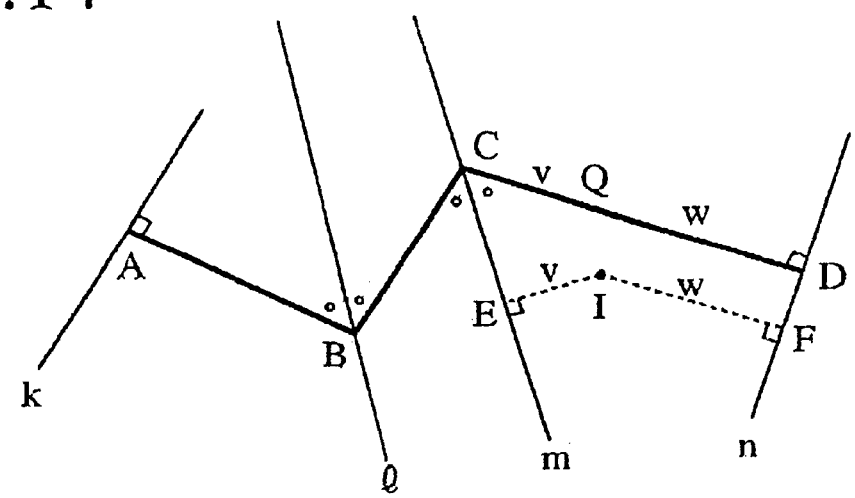
FIG. 14 is a diagram showing a technique for calculating an interior division ratio for a segment according to the second embodiment.

FIG. 13 shows a flow chart for a procedure of the processing carried out by the mapping unit 2. The bisector generation unit 201 generates a bisector line for a vertex angle at each vertex of the polygonal line. However, for each endpoint of the polygonal line, the bisector generation unit 201 generates a perpendicular line instead of a bisector line (step S3001). In FIG. 14, a polygonal line ABCD has endpoints A and D. The bisector generation unit 201 generates perpendicular lines k and n for the endpoints A and D, and bisector lines l and m for vertexes B and C.

The judging unit 202 judges, for each segment of the polygonal line, whether a vertex at each end of the segment and the input coordinates are on the same side of a perpendicular line or a bisector line that passes through the opposite Vertex at the other end of the segment. In FIG. 14, the vertex C of a segment CD faces the perpendicular line n passing through the vertex D, and the vertex C and an input point I are on the same side of the perpendicular line n. Similarly, the vertex D and the input point I are on the same side of the bisector line m that is passing through the vertex C and facing the vertex D. Accordingly, it is determined that the input point I which is positioned at the input coordinates is located between the lines m and n. On the other hand, with respect to a segment BC, the vertex C and the input point I are on the same side of the bisector line l that is passing through the vertex B and facing the vertex C, but the vertex B and input point I are on opposite sides of the bisector line m in that is passing through the vertex C and facing the vertex B. Accordingly, it is determined that the input point I is not located between the lines l and m.

In this way, the judging unit 202 determines, for each segment, whether or not the input coordinates are located between lines that pass through the opposite ends of the segment, by judging whether or not the vertex at each end of the segment and the input coordinates are on the same side of a line that passes through the opposite vertex at the other end of the segment (step S3002).

The first distance calculation unit 203 calculates, for each segment of the polygonal line, a distance between the input coordinates and each segment, similarly as the distance calculation unit 23 of FIG. 6 (step S3003).

The selection unit 204 selects a segment nearest to the input coordinates from among the segments with bisector lines or perpendicular lines between which the input coordinates are located according to the result provided by the judging unit 202 and the first distance calculation unit 203 (step S3004). In FIG. 14, only the segment CD has bisector lines or perpendicular lines (m and n) between which the input coordinates are located, so that above segment selection is unnecessary, but in general, there may be plural segments with bisector lines or perpendicular lines between which the input coordinates are located. In such a case, one of the segments that is nearest to the input coordinates is selected.

The second distance calculation unit 205 calculates, for the selected segment provided by the selection unit 204, distances between the input coordinates and the lines passing through the ends of the selected segment (S3005). In FIG. 14, the second distance calculation unit 205 calculates a distance IE between the input point I and the line m and a distance IF between the input point I and the line n.

The interior division unit 206 calculates the interior division ratio between the calculated distances provided by the second calculation unit 205, obtains a point that internally divides the selected segment at the calculated ratio, and sets the obtained point as the position of the thumb(step S3006). In FIG. 14, a point Q that divides the segment CD at the ratio of v:w is determined to be the position of the thumb.

Now, a technique for judging whether or not two points are on the same side of a given line such as a perpendicular line or a bisector line will be explained with reference to FIGS. 15 and 16.

Figure 15:
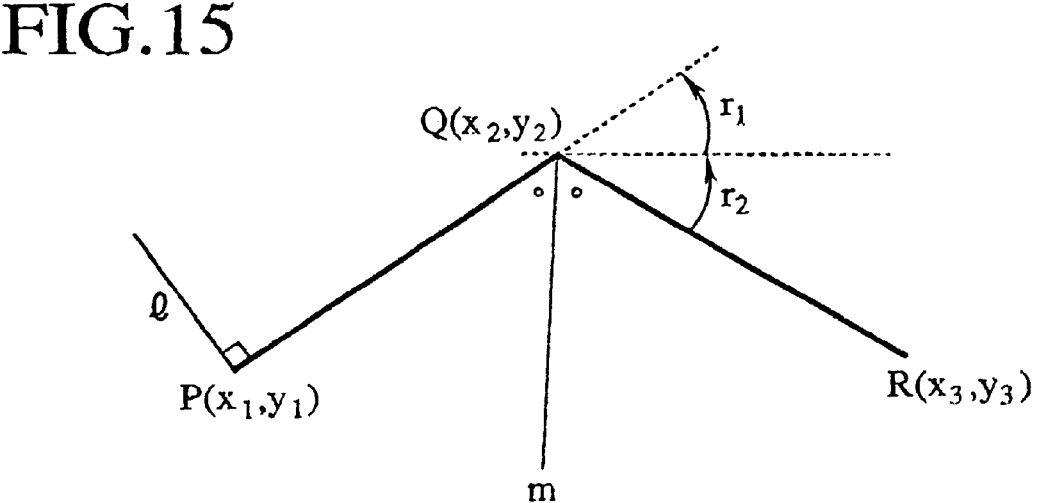
FIG. 15 is a diagram showing a technique for generating a perpendicular line and a bisector line according to the second embodiment.
Figure 16:
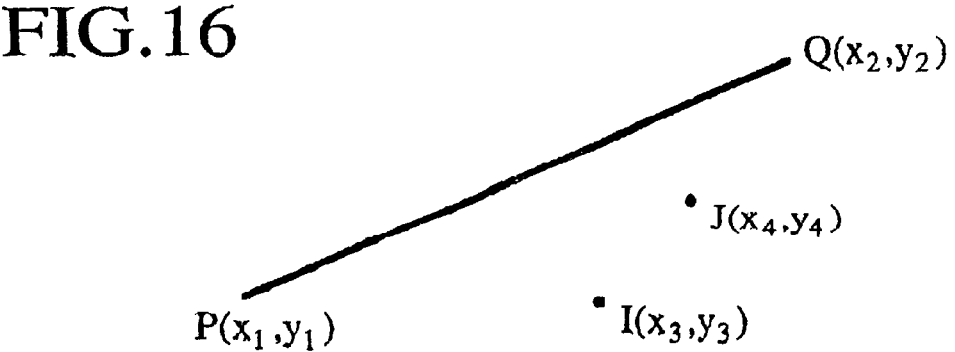
FIG. 16 is a diagram showing a technique of judging whether or not two points are on the same side of a given line.

In FIG. 15, there are points $P(x_1, y_1)$, $Q(x_2, y_2)$, and $R(x_3, y_3)$. A perpendicular line l passing through the point P and intersecting orthogonally with a segment PQ is expressed by the following formula (4):

$$\begin{pmatrix} x \\ y \end{pmatrix} = t \begin{pmatrix} y_1 - y_2 \\ x_2 - x_1 \end{pmatrix} + \begin{pmatrix} x_1 \\ y_1 \end{pmatrix} \qquad (4)$$

A bisector line m of an angle Q is expressed by the following formula (5):

$$\begin{pmatrix} x \\ y \end{pmatrix} = t \begin{pmatrix} \cos\theta \\ \sin\theta \end{pmatrix} + \begin{pmatrix} x_2 \\ y_2 \end{pmatrix} \qquad (5)$$

where θ is:

$$\theta = (\pi - (r_1 - r_2))/2 + r_1 \qquad (6)$$

$r_1 = a\tan 2(y_2 - y_1, x_2 - x_1)$
$r_2 = a\tan 2(y_3 - y_2, x_3 - x_2)$

And the function a tan 2(y, x) is given by the following formula (7):

$$a\tan 2(y, x) = \begin{cases} \arctan(y/x) & \text{if } x \neq 0 \\ \pi/2 & \text{if } x = 0 \wedge y > 0 \\ -\pi/2 & \text{if } x = 0 \wedge y < 0 \end{cases} \qquad (7)$$

Next, when there is a line PQ extending between a point $P(x_1, y_1)$ and a point $Q(x_2, y_2)$, whether a point $I(x_3, y_3)$ and a point $J(x_4, y_4)$ are on the same side of the line PQ or not is judged as follows. A judging function d(x, y) is defined by the following formula (8):

$$d(x, y) = (y_2 - y_1)(x_1 - x) + (x_1 - x_2)(y_1 - y) \qquad (8)$$

If $D = d(x_3, y_3) \cdot d(x_4, y_4) > 0$, the points I and J are on the same side of the line PQ. If D=0, at least one of the points I and J is on the line PQ. If D<0, the points I and J are on opposite sides of the line PQ.

The mapping unit 2 of the second embodiment moves the thumb on the polygonal line to a position that is close to (but not always nearest to) the input coordinates even if the input coordinates are not on the polygonal line. In addition, the second embodiment continuously moves the thumb around each vertex of the polygonal line according to the movement of the input coordinates.

Figure 17A:
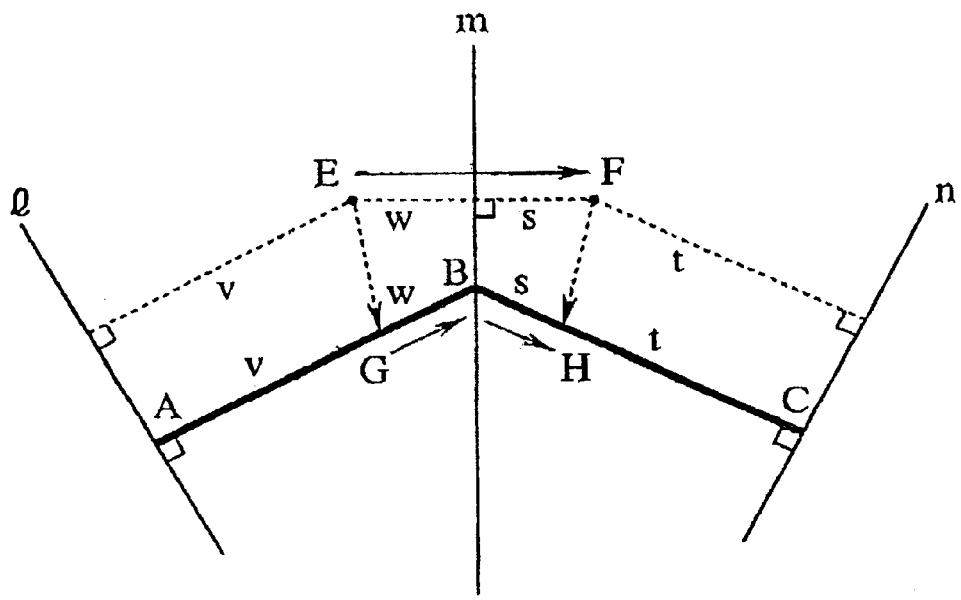
FIGS. 17A and 17B are diagrams showing relationships between input coordinates and a thumb according to the second embodiment.
Figure 17B:
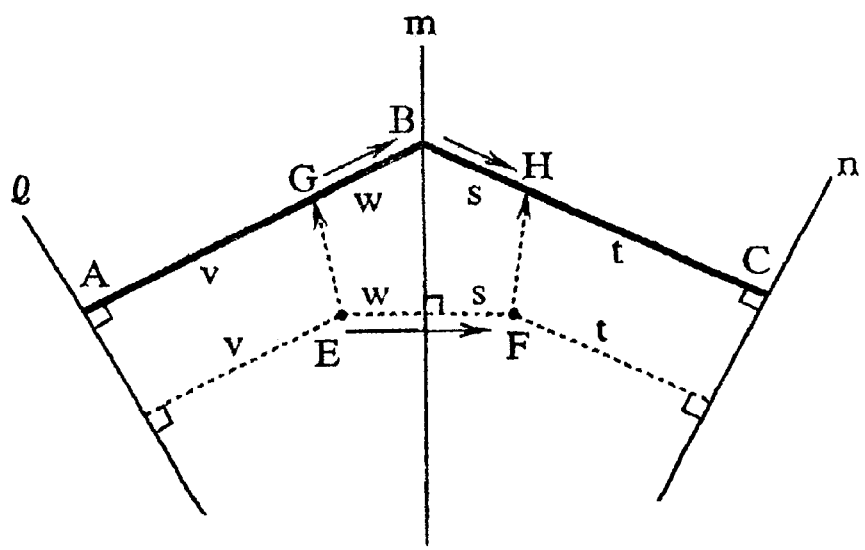

FIGS. 17A and 17B correspond to FIGS. 10 and 11 of the first embodiment and show the operation in the case where the same situation as in FIG. 10 and FIG. 11 is processed by the mapping unit 2 of the second embodiment.

In FIG. 17A, assume that the input coordinates are continuously moved from a point E to a point F with respect to the polygonal line ABC. At this time, the thumb continuously moves from a point G to a point H along the polygonal line ABC. Here, if a ratio of the distances between the point E and lines l and m are v:w, the point G is a position that internally divides the segment AB at the ratio of v:w. Similarly, the point H is a position that internally divides the segment BC at the ratio of s:t. Unlike the first embodiment, the thumb does not stays at a vertex in the second embodiment.

In FIG. 17B, the thumb is continuously moved from a point G to a point H along the polygonal line ABC without jumping between them when the input coordinates continuously moves from a point E to a point F.

Note that in some cases, the second embodiment cannot determine the position of the thumb on the polygonal line. In FIGS. 17A and 17B, If the input point I is in any one of areas on the left of the line l and an area on the right of the line n, it is impossible to determine the position of the thumb because there are no lines between which the input point I is located.

In this case, a vertex nearest to the input point I is selected as the position of the thumb, similarly as in the first embodiment. For example, the vertex C is the position of the thumb when the input point I is on the right side of the line n.

Figure 18A:
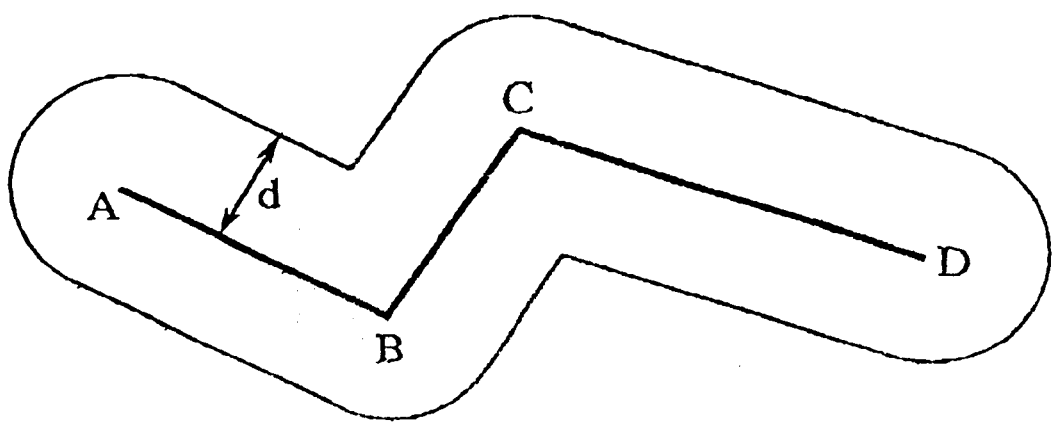
FIGS. 18A and 18B are diagrams showing ranges of input coordinates to move a thumb.

On the other hand, it is preferable not to move the thumb when the input coordinates are too far from the polygonal line. FIG. 18A shows a boundary that is away from the polygonal line ABCD by a distance d. If the input coordinates are not within the boundary, the thumb on the polygonal line is not moved according to the input coordinates. To achieve this, the thumb position selection unit 24 of FIG. 6 or the selection unit 204 of FIG. 12 stops processing if a distance from the input point to the nearest segment is greater than a threshold d.

Figure 18B:
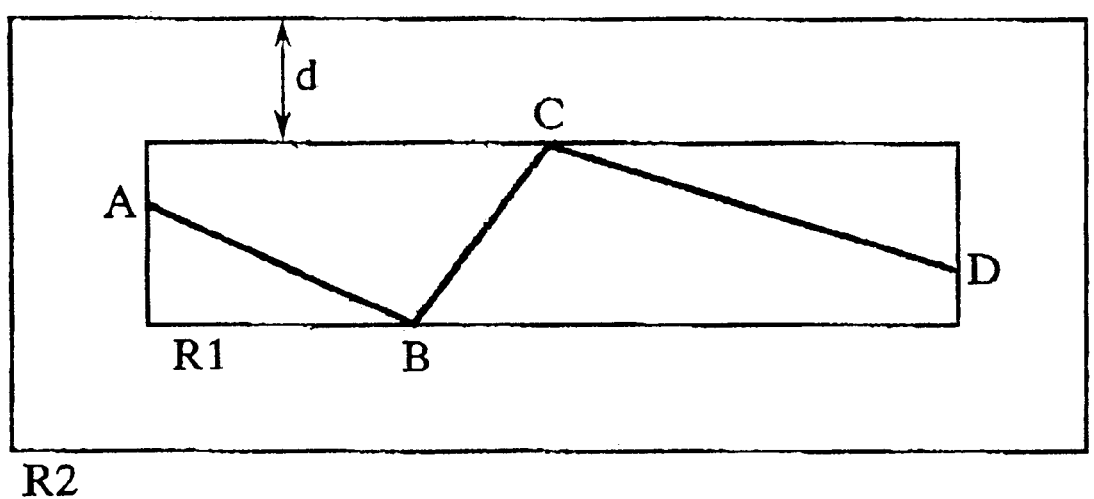

FIG. 18B shows a circumscribed rectangle R1 of the polygonal line and a rectangular area R2 expanded from the rectangle R1 by a distance d in every direction. If the input point is within the area R2, the thumb is moved along the polygonal line ABCD accordingly. To achieve this, the maximum and minimum values of the X- and Y-coordinates of each vertex of the polygonal line are obtained in advance, and the input coordinates are compared with them.

In this way, the mapping unit 2 of the second embodiment is capable of continuously mapping the input coordinates to the position of the thumb so that the thumb is smoothly moved along the polygonal line even if the input coordinates are around vertexes. Accordingly, the second embodiment enables the user to obtain natural and smooth playback results.

THIRD EMBODIMENT

Referring now to FIG. 19 to FIG. 23, the third embodiment of the GUI scheme using a polygonal-line-shaped slider according to the present invention will be described in detail. The third embodiment more naturally maps the movement of input coordinates to the position of the thumb on the polygonal line than the second embodiment when the input coordinates are close to the polygonal line. The third embodiment is a modification of the second embodiment in which the mapping unit 2 of FIG. 12 is replaced by the mapping unit 2 of FIG. 19.

When the input coordinates are close to the polygonal line that forms the slider, the second embodiment causes unnatural movement of the thumb along the polygonal line. This will now be explained with reference to FIG. 23. Assume that an input point I is set on a segment BC of the polygonal line ABC. A bisector line l is generated at a vertex B, and a perpendicular line m is drawn through a vertex C of the segment BC. In this case, the mapping unit 2 of the second embodiment calculates the distance IP between the input point I and the line l and the distance IC between the input point I and the line m. Then, the second embodiment selects a point Q2 as the position of the thumb, since the distance IP is shorter than the distance IB between the input point I and the vertex B. The point Q2 is shifted towards the vertex B from the input point I itself. Thus, the second embodiment maps the input point to the position of the thumb unnaturally in the above situation.

Figure 19:
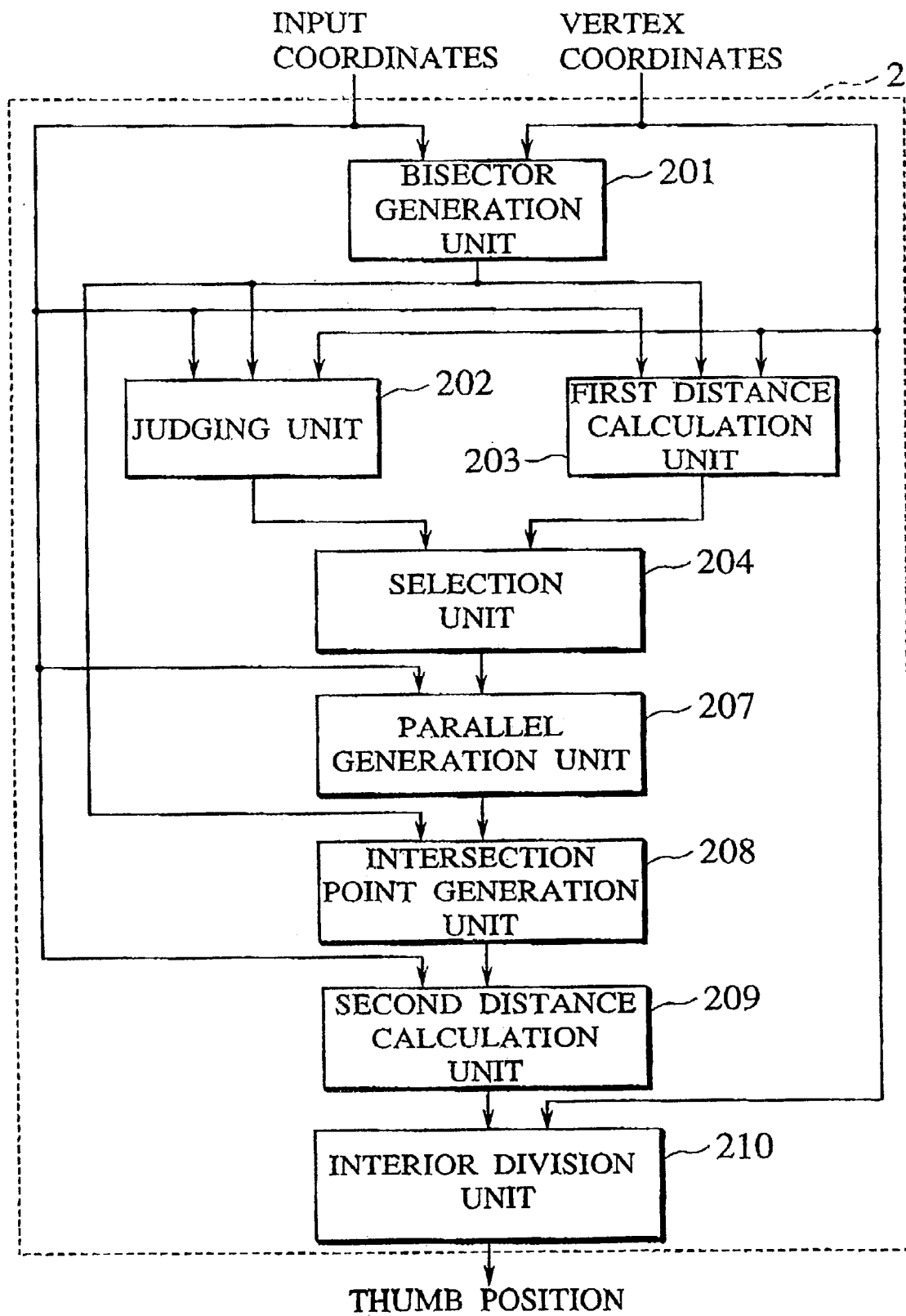
FIG. 19 is a block diagram showing a detailed configuration of a mapping unit according to the third embodiment of the present invention.

To solve this problem, the third embodiment employs the mapping unit 2 of FIG. 19.

Next, the processing of the mapping unit 2 of the third embodiment will be explained in detail. FIG. 19 shows a detail configuration of the mapping unit 2 according to the third embodiment.

The mapping unit 2 of the third embodiment comprises a bisector generation unit 201, a judging unit 202, a first distance calculation unit 203, a selection unit 204, a parallel generation unit 207, an intersection point generation unit 208, a second distance calculation unit 209, and an interior division unit 210. The units 201, 202, 203, and 204 in FIG. 19 are the same as those of FIG. 12.

Figure 20:
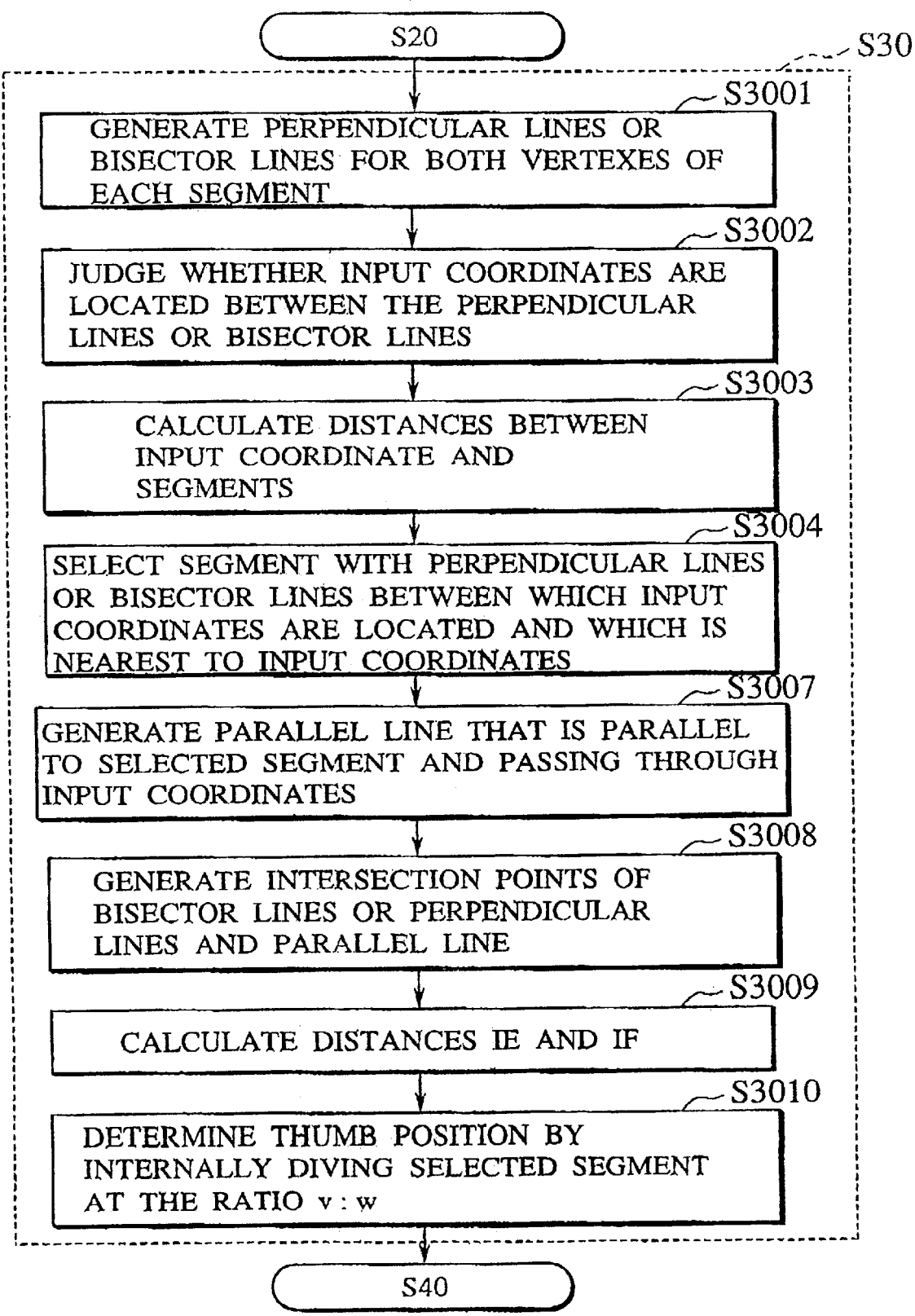
FIG. 20 is a flow chart showing a processing carried out in step S30 of FIG. 5 according to the third embodiment.
Figure 21:
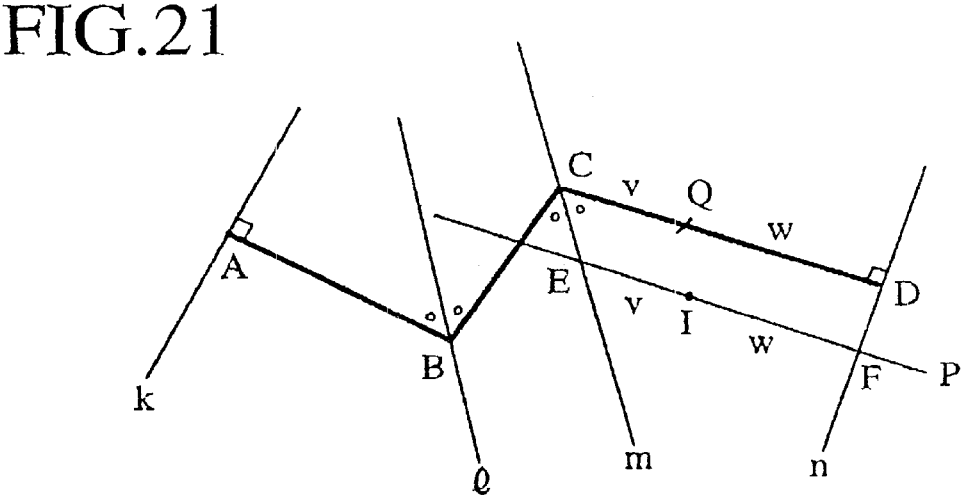
FIG. 21 is a diagram showing a technique for calculating an interior division ratio for a segment according to the third embodiment.

FIG. 20 shows a flow chart for a procedure of the processing carried out by the mapping unit 2. Steps S3001 to S3004 are the same as those of FIG. 13. The parallel generation unit 207 generates a parallel line that is passing through the input coordinates and parallel to the segment selected by the selection unit 204 (step S3007). In FIG. 21, the parallel generation unit 207 generates a parallel line p that Is passing through an input point I and parallel to a selected segment CD.

The Intersection point generation unit 208 generates an intersection point of the parallel line generated by the parallel generation unit 207 and the perpendicular line or the bisector line that passes through each vertex of the segment selected by the selection unit 204. In FIG. 21, the intersection point generation unit 208 generates an intersection point E of the parallel line p and the bisector line m passing through a vertex C, and an intersection point F of the parallel line p and the perpendicular line n passing through a vertex D (step S3008).

The second distance calculation unit 209 calculates a distance between the input coordinates and each intersection point generated by the intersection point generation unit 208. In FIG. 21, the second distance calculation unit 209 calculates a distance IE between the input point I and the intersection point E, and a distance IF between the input point I and the intersection point F (step S3009).

The interior division unit 210 calculates a ratio of the distances calculated by the second distance calculation unit 209, obtains a point that internally divides the segment selected by the selection unit 204 at the calculated ratio, and determines the obtained point (i.e., dividing point) as the position of the thumb. In FIG. 21, the interior division unit 210 obtains a point Q that internally divides the selected segment CD at the ratio of v:w as the position of the thumb.

Next, a technique for finding a parallel line of a given segment, a technique for finding an intersection point of two lines, and a technique for calculating a distance between two points will be explained with reference to FIGS. 22A and 22B.

Figure 22A:
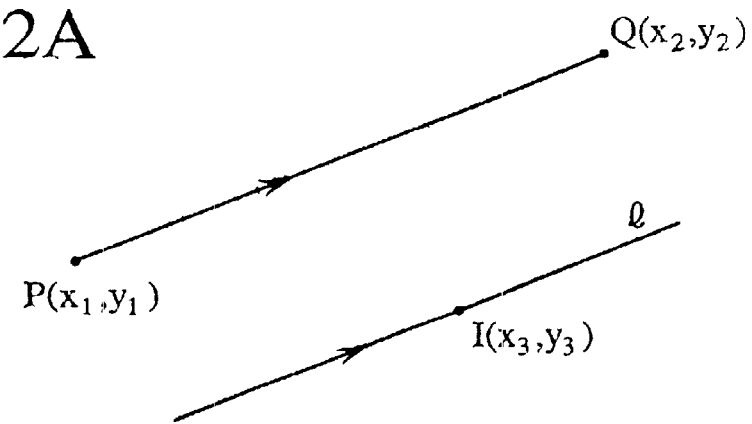
FIGS. 22A and 22B are diagrams showing a technique for calculating a parallel line of a given segment and an intersection point of input coordinates and a thumb according to the third embodiment.

In FIG. 22A, a segment PQ extends between points $P(x_1, y_1)$ and $Q(x_2, y_2)$. A parallel line l that is passing through a point $I(x_3, y_3)$ and parallel to the segment PQ is expressed by the following formula (9):

$$\begin{pmatrix} x \\ y \end{pmatrix} = t \begin{pmatrix} x_2 - x_1 \\ y_2 - y_1 \end{pmatrix} + \begin{pmatrix} x_3 \\ y_3 \end{pmatrix} \quad (9)$$

Figure 22B:
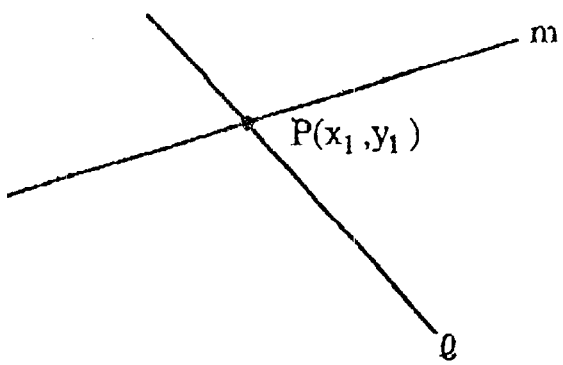
Figure 23:
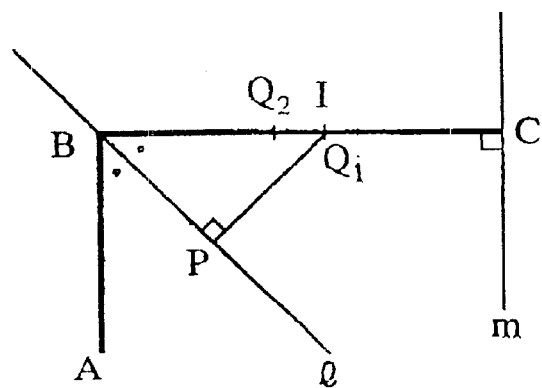
FIG. 23 is a diagram showing a relationship between input coordinates and a thumb according to the third embodiment.

In FIG. 22B, lines l and m cross at an intersection point $P(x_1, y_1)$ that Is expressed by the following formula (10):

$$\begin{pmatrix} x_1 \\ y_1 \end{pmatrix} = \begin{pmatrix} \{bce - afg + ae(h-d)\}/(be - af) \\ \{adf - beh + bf(g - c)\}/(af - be) \end{pmatrix} \quad (10)$$

where the line l is expressed by the following formula (11):

$$\begin{pmatrix} x \\ y \end{pmatrix} = t \begin{pmatrix} a \\ b \end{pmatrix} + \begin{pmatrix} c \\ d \end{pmatrix} \quad (12)$$

and the line m is expressed by the following formula (12):

$$\begin{pmatrix} x \\ y \end{pmatrix} = s \begin{pmatrix} e \\ f \end{pmatrix} + \begin{pmatrix} g \\ h \end{pmatrix}$$

The distance d between two points $P(x_1, y_1)$ and $Q(x_2, y_2)$ is calculated by the following formula (13):

$$d = \sqrt{((x_1 - x_2)^2 + (y_1 - y_2)^2)} \quad (13)$$

Like the second embodiment, the mapping unit 2 of FIG. 19 according to the third embodiment properly moves the thumb along the polygonal line even if the input coordinates are not on the polygonal line and makes the movement of the thumb around each vertex of the polygonal line smooth according to the movement of the input coordinates. In addition, the third embodiment properly maps the movement of the thumb to that of the input coordinates even if the input coordinates are close to the polygonal line. For example, in FIG. 23, the input point I is on the segment BC of the polygonal line ABC. The mapping unit 2 of the third embodiment generates a parallel line that is passing through the input point I and parallel to the segment BC. In this example, the parallel line overlaps with the segment BC. As a result, intersection points of the parallel line and each of the lines l and m are the vertexes B and C, and therefore, the thumb is positioned at a point Q1 that is identical to the input point I.

FOURTH EMBODIMENT

Figure 24:
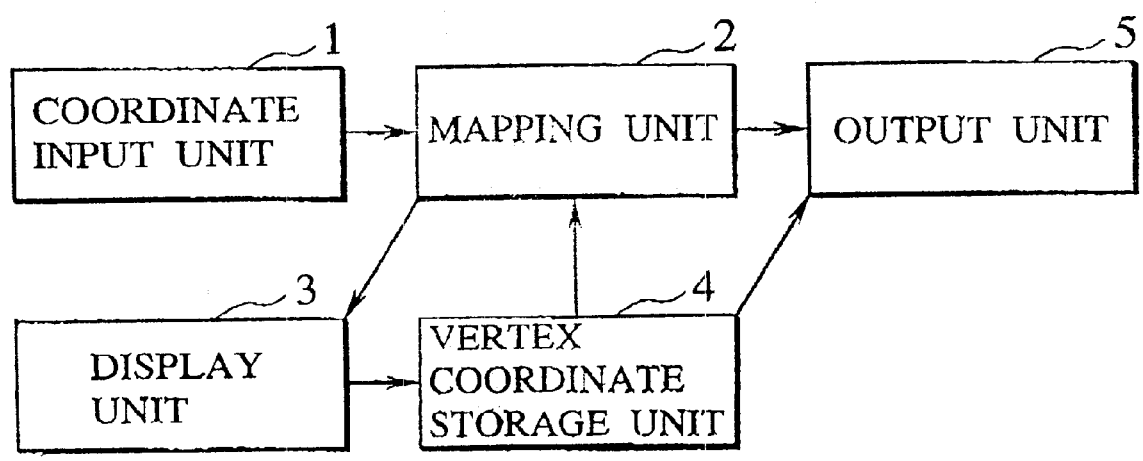
FIG. 24 is a block diagram showing a polygonal-line-shaped slider apparatus according to the fourth embodiment of the present invention.
Figure 25:
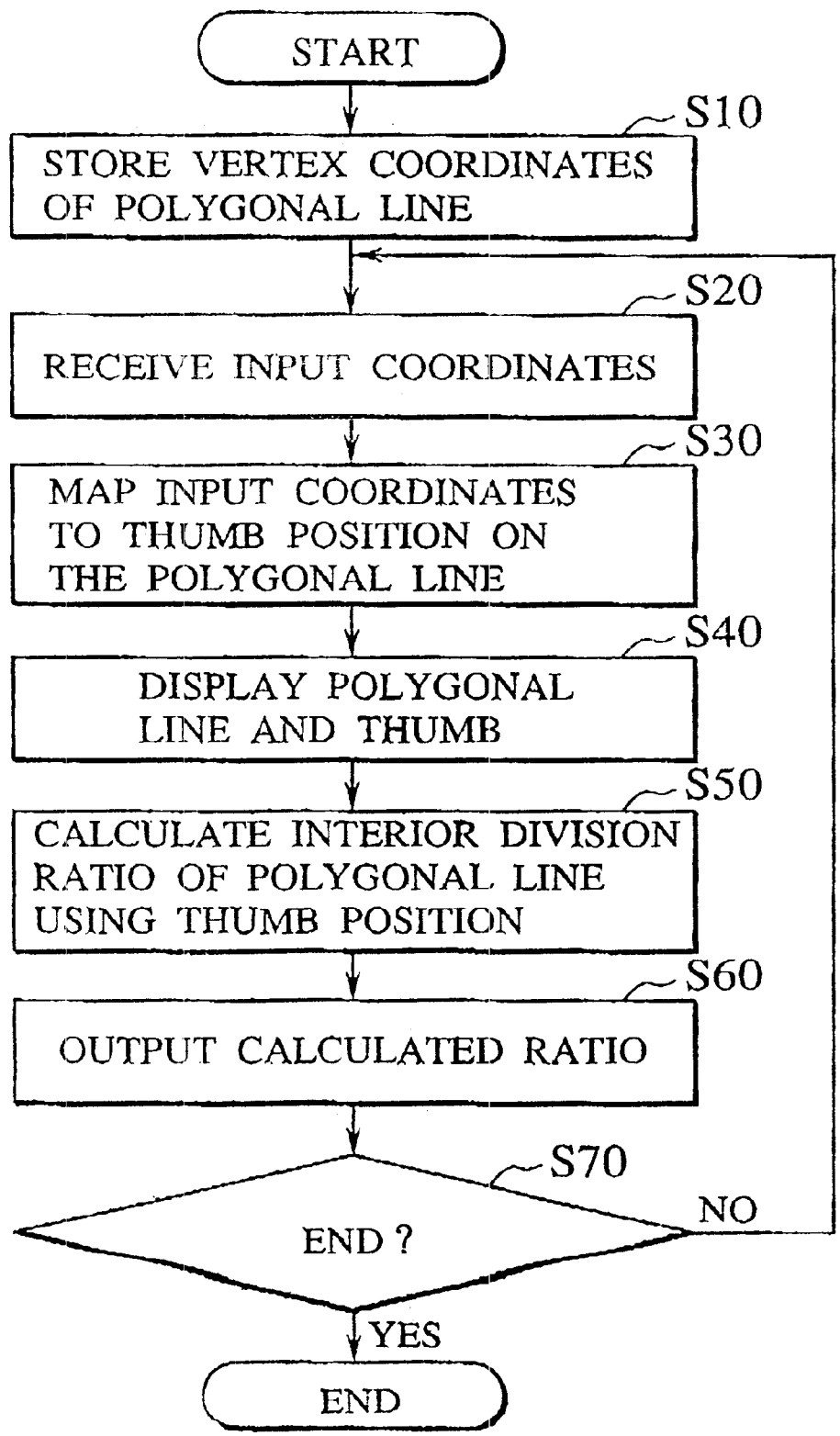
FIG. 25 is a flow chart showing a processing carried out by the apparatus of FIG. 24 according to the fourth embodiment.
Figure 26:
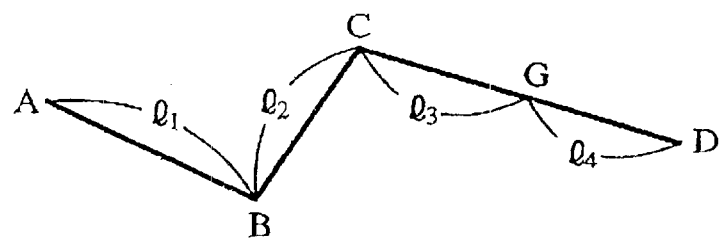
FIG. 26 is a diagram showing an exemplary polygonal-line-shaped slider provided by an output unit according to the fourth embodiment.

Referring now to FIG. 24 to FIG. 26, the fourth embodiment of the GUI scheme using a polygonal-line-shaped slider according to the present invention will be described in detail. The fourth embodiment provides data corresponding to the position of the thumb on the polygonal line.

FIG. 24 shows a configuration of the polygonal-line-shaped slider apparatus of the fourth embodiment.

The fourth embodiment is a modification of the above embodiments in which an output unit 5 is provided in addition to the arrangement of FIG. 3, as shown in FIG. 24. Namely, the apparatus of the fourth embodiment comprises a coordinate input unit 1, a mapping unit 2, a display unit 3, a vertex storage unit 4, and the output unit 5. The units 1 to 4 are the same as those of FIG. 3. The position of the thumb on the polygonal line divides the polygonal line at a certain interior division ratio. The output unit 5 provides this interior division ratio as a value corresponding to the position of the thumb on the polygonal line.

Next, the processing of the output unit 5 of the fourth embodiment will be explained in detail.

FIG. 25 shows a flow chart for a procedure of the processing carried out by the apparatus of the fourth embodiment, where the steps S50 and S60 to be carried by the output unit 5 are added to the procedure of FIG. 5. Steps S10 to S40 are the same as those of the first embodiment of FIG. 5.

Step S40 displays the polygonal line and the thumb. The output unit 5 calculates an interior division ratio at which the position of the thumb internally divides the whole polygonal line (step S50), and outputs data corresponding to the calculated interior division ratio (step S60). For example, in FIG. 26, a polygonal line ABCD is composed of segments AB, BC, and CD. The segments AB and BC have lengths l1 and l2, respectively. The thumb is positioned at a point G in the segment CD. Sections CG and GD of the segment CD have lengths l3 and l4, respectively. The distance between the points G and D is l4 and the distance between the points A and G is (l1+l2+l3). Accordingly, the Interior division ratio r at which the position of the thumb divides the polygonal line ABCD is as follows:

$$r = (l1 + l2 + l3)/(l1 + l2 + l3 + l4) \quad (14)$$

In this way, the output unit 5 of the fourth embodiment provides values at regular intervals over the whole polygonal line depending on the position of the thumb on the polygonal line. Exemplary data provided by the output unit 5 may be data related to frame numbers of video data so that the position of the thumb may indicate the frame number. Each interior division ratio may be multiplied by appropriate number. For example, it may be multiplied by 100 to indicate a percentage.

FIFTH EMBODIMENT

Figure 27:
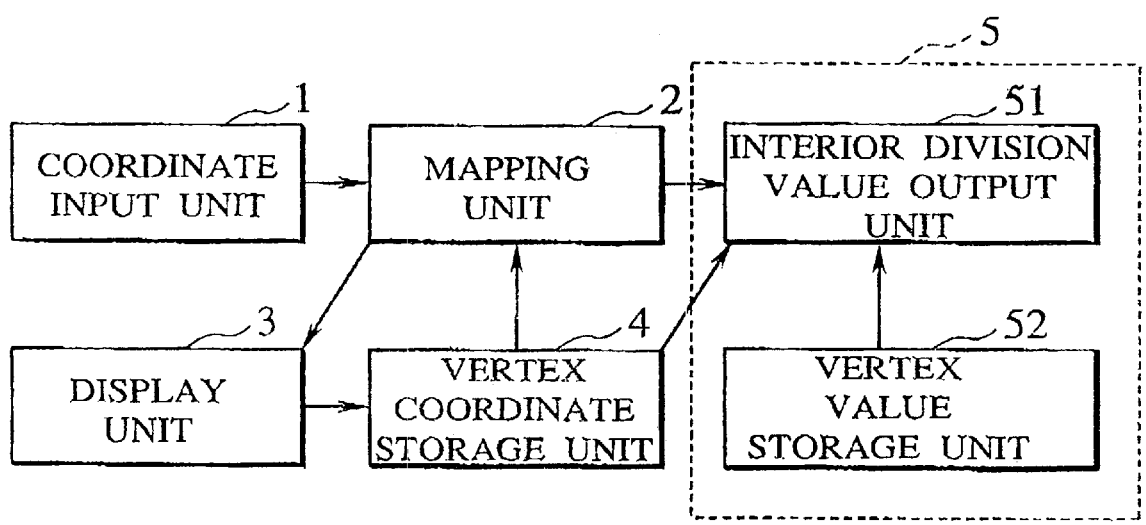
FIG. 27 is a block diagram showing a polygonal-line-shaped slider apparatus according to the fifth embodiment of the present invention.

Referring now to FIG. 27 to FIG. 30, the fifth embodiment of the GUI scheme using a polygonal-line-shaped slider according to the present invention will be described in detail. The fifth embodiment assigns values to different segments of the polygonal line at different scales. The fifth embodiment is a modification of the fourth embodiment in which an output unit 50 formed by an interior division value output unit 51 and a vertex value storage unit 52 of FIG. 27 is provided instead of the output unit 5 of FIG. 24. The apparatus of the fifth embodiment comprises a coordinate input unit 1, a mapping unit 2, a display unit 3, a vertex storage unit 4, and the output unit 50. The units 1 to 4 are the same as those of the first embodiment of FIG. 3.

Next, the processing of the output unit 5 of the fifth embodiment will be explained in detail. FIG. 27 shows a configuration of the polygonal-line-shaped slider apparatus according to the fifth embodiment.

Figure 29:
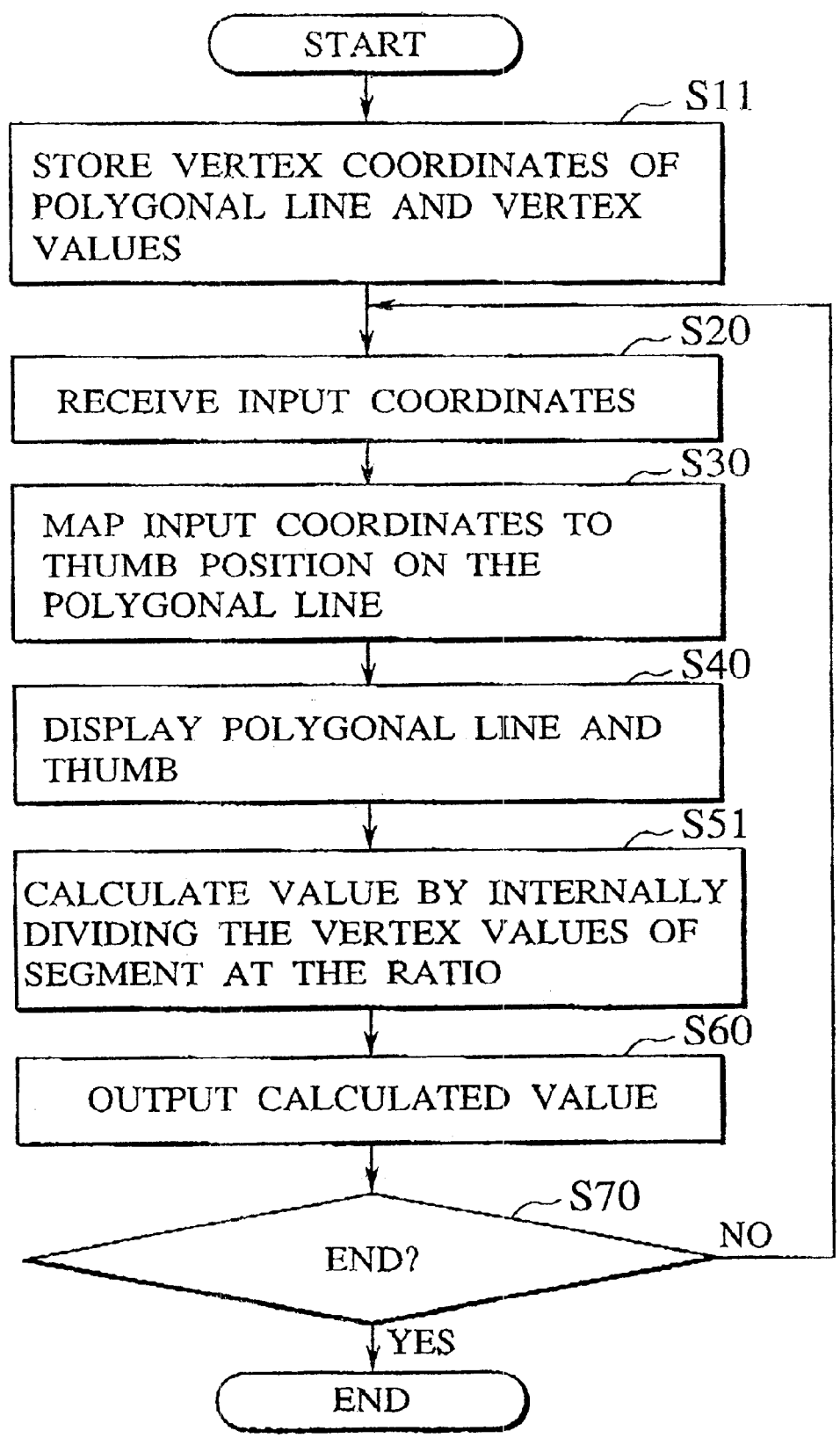
FIG. 29 is a flow chart showing a processing carried out by the apparatus according to the fifth embodiment.
Figure 30:
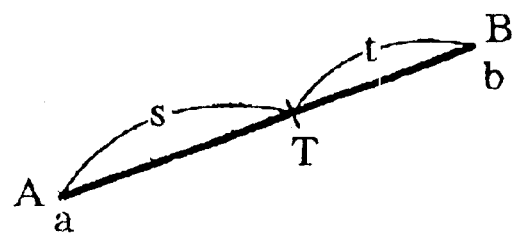
FIG. 30 is a diagram showing an exemplary output provided by an interior division value output unit according to the fifth embodiment.

FIG. 29 shows a flow chart for a procedure of the processing carried out by the fifth embodiment. The vertex storage unit 4 stores the coordinates of vertexes of the polygonal line and the vertex value storage unit 52 stores values assigned to the vertexes in a storage medium such as a semiconductor memory or a magnetic disk (step S11).

These values assigned to the vertexes may be included in the vertex storage unit 4 as shown in FIG. 28. Steps S20 and S30 are the same as those of FIG. 25 of the above embodiments.

Step S40 displays the polygonal line and the thumb. Here, the interior division ratio is already calculated as a ratio at which the position of the thumb divides a segment on which the thumb is located. Thereafter, the interior division value output unit 51 internally divides the values assigned to the vertexes of the segment in question at the calculated interior division ratio and provides the obtained value. For example, in FIG. 30, the thumb T is on a segment AB that has vertexes A and B. Vertex values a and b are assigned to the vertexes A and B, respectively. The position of the thumb T internally divides the segment AB at a ratio of AT:TB=s:t. Then, the interior division value output unit 51 provides an output O given by the following formula (15):

$$O=(ta+sb)/(t+s) \qquad (15)$$

Steps S60 and S70 are the same as those of FIG. 25.

In this way, the output unit 5 of the fifth embodiment employs different scales for different segments of the polygonal line and continuously provides values even around vertexes of the polygonal

SIXTH EMBODIMENT

Referring now to FIG. 31 to FIG. 34, the sixth embodiment of the GUI scheme using a polygonal-line-shaped slider according to the present invention will be described in detail. The sixth embodiment is directed to the case where a plurality of polygonal-line-shaped sliders are present and only one of them is to be activated as a GUI. The sixth embodiment is a modification of the first embodiment in which a polygonal line selection unit 6 is added to the first embodiment of FIG. 3.

Figure 33A:
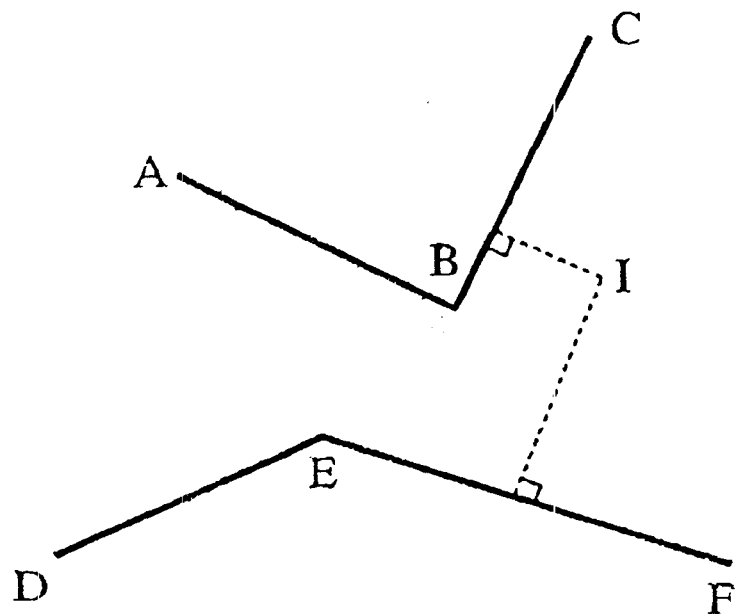
FIGS. 33A and 33B are diagrams showing an exemplary case of polygonal line selection provided by a polygonal line selection unit according to the sixth embodiment.
Figure 33B:
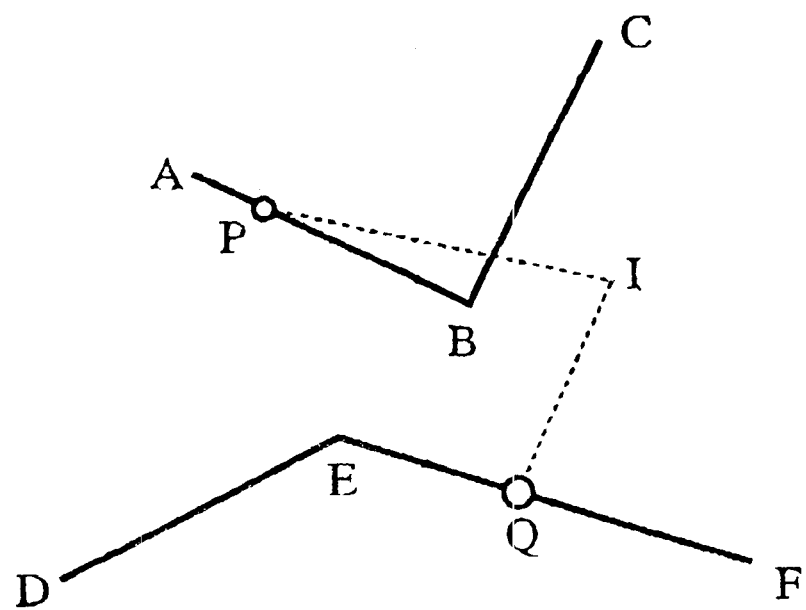

Suppose that plural polygonal lines exist. FIGS. 33A and 33B show two polygonal lines ABC and DEF. When an input point I is entered, there can be a case where thumbs on both polygonal lines are to be individually moved, or a case where only one of the polygonal lines is to be activated such that only the thumb on the activated polygonal line moves. The case of individually moving the thumbs on both polygonal lines can be realized by utilizing any one of the embodiments mentioned above. The case of activating only one of the polygonal lines requires a selection of the polygonal line. The sixth embodiment provides this function for selecting one polygonal line among plural polygonal lines.

Figure 31:
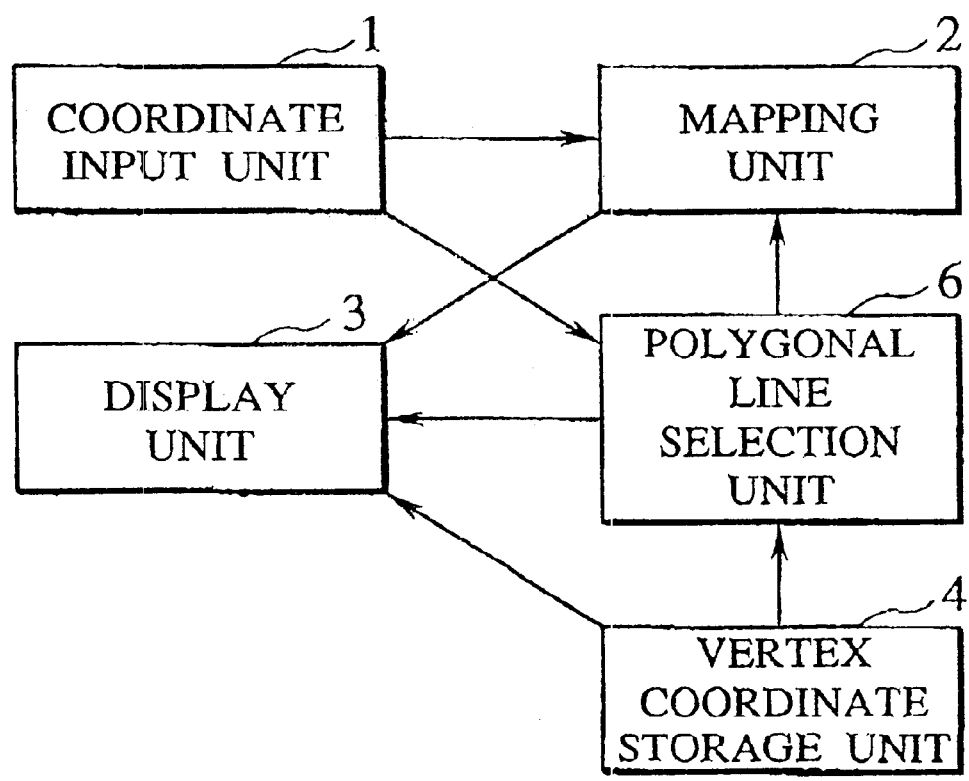
FIG. 31 is a block diagram showing a polygonal-line-shaped slider apparatus according to the sixth embodiment of the present invention.

Next, the processing of the apparatus of the sixth embodiment will be explained in detail. FIG. 31 shows a configuration of the apparatus of the sixth embodiment.

In FIG. 31, the.apparatus of the sixth embodiment comprises a coordinate input unit 1, a mapping unit 2, a display unit 3, a vertex storage unit 4, and the polygonal line selection unit 6. The units 1 to 4 are the same as those of the first embodiment of FIG. 3. The polygonal line selection unit 6 of the sixth embodiment may be provided in combination with any one of the above embodiments.

Figure 32:
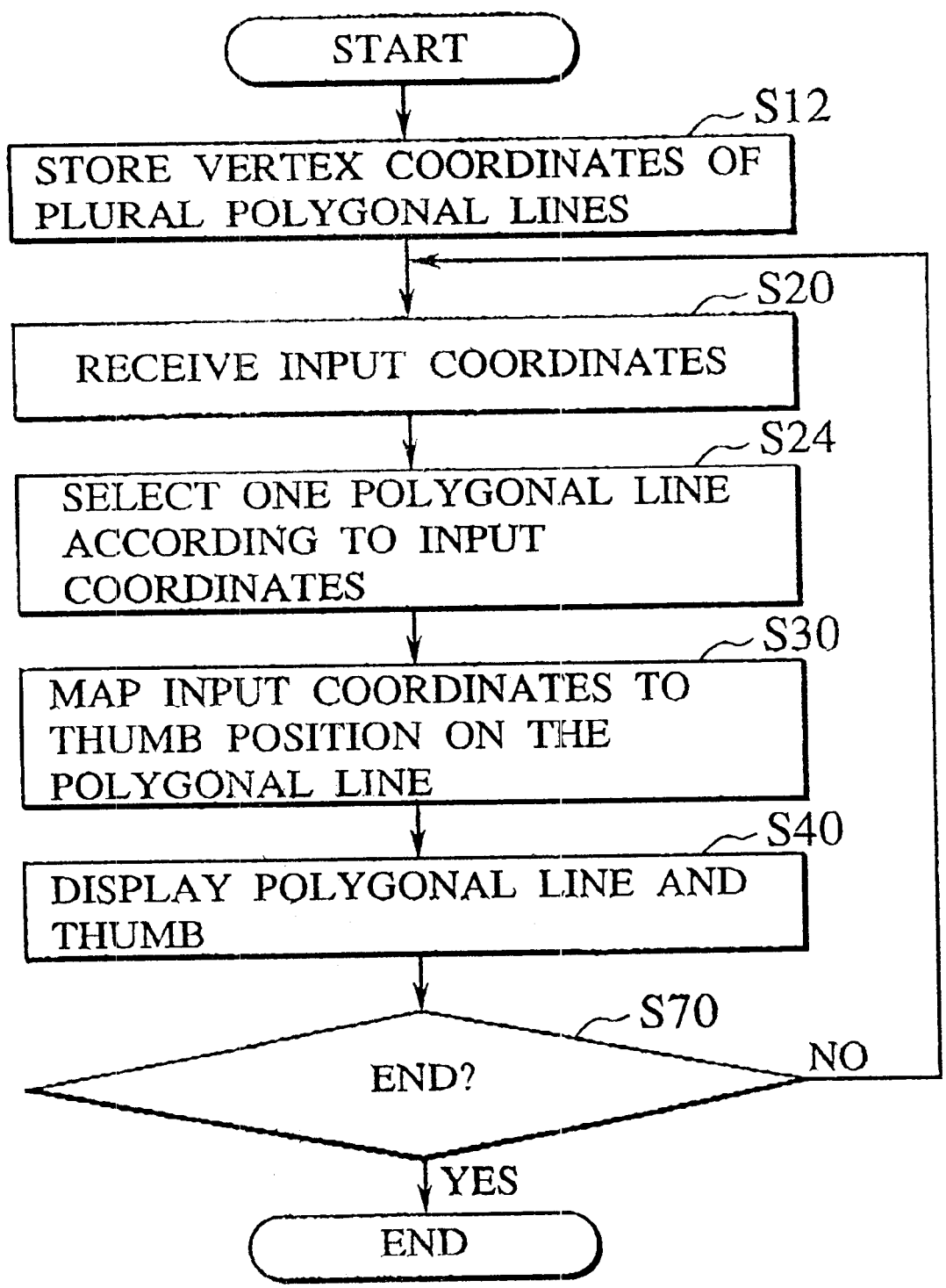
FIG. 32 is a flow chart showing a processing carried out by the apparatus according to the sixth embodiment.

FIG. 32 shows a flow chart for a procedure of the processing carried out by the apparatus of FIG. 31 according to the sixth embodiment. The vertex storage unit 4 stores vertex data of vertexes of a plurality of polygonal lines as shown in FIG. 4 (step S12). Since each polygonal line is assigned with a line number, it is possible to identify each polygonal line by its line number. Accordingly, by giving only the vertex data of a certain polygonal line number selected for the input coordinates to the mapping unit 2, it is possible to restrict the polygonal line to be activated.

The coordinate Input unit 1 receives the input coordinates (step S20). The polygonal line selection unit 6 selects one of the polygonal lines according to the input coordinates (step S24). Steps S30 to S70 are the same as those of the above embodiments of FIG. 5. As one exemplary selection method, a polygonal line with a segment nearest to the input coordinates can be selected as the polygonal line to be activated. In FIG. 33A, a segment BC is nearer to an input point I than a segment EF so that the polygonal line selection unit 6 selects the polygonal line ABC. The distance between a given point and a given segment can be calculated by the distance calculation unit 23 or the first distance calculation unit 203 described above.

As another exemplary selection method, a polygonal line with a thumb whose present position is nearest to the input coordinates can be selected as the polygonal line to be activated. In FIG. 33B, a thumb Q Is closer to an input point I than a thumb P so that the polygonal line selection unit 6 selects the polygonal line DEP.

Figure 34:
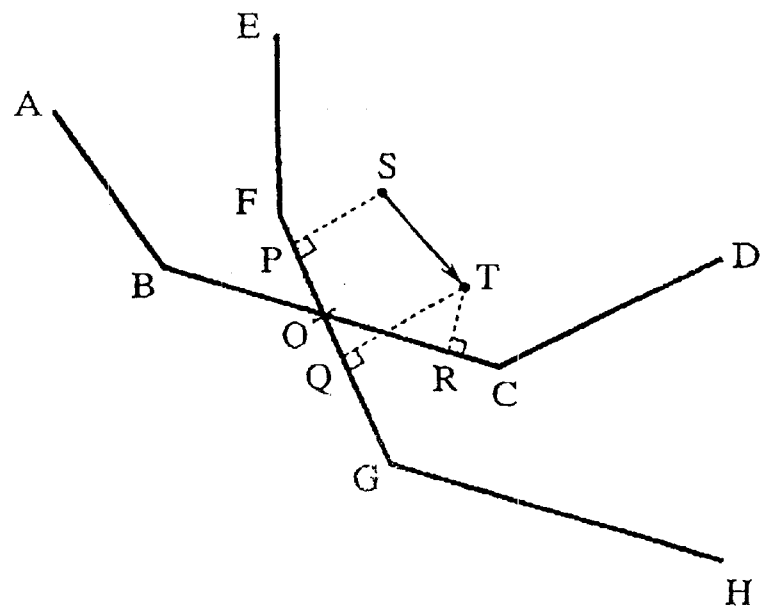
FIG. 34 is a diagram showing the movement of a thumb according to the sixth embodiment.

Next, when there are polygonal lines that are close to each other or intersect with each other, the selected polygonal line may be switched from one to another. In FIG. 34, a polygonal line ABCD intersects with a polygonal line EFGH at an intersection point O. Here, the case where the mapping unit 2 determines a point nearest to the input coordinates as the position of the thumb on each polygonal line as in the first embodiment, and the polygonal line selection unit 6 of the sixth embodiment selects a polygonal line having a thumb nearest to the input coordinates will be described as a simple example, although the sixth embodiment can be combined with any of the other embodiments described above.

In FIG. 34, if the input coordinates are moved from a point S to a point T and If only the polygonal line EFGH is selected, the thumb will be continuously moved from a point P to a point Q. On the other hand, if the polygonal line EFGH is switched to the polygonal line ABCD at the intersection point O, the thumb will be moved along a route of P→O→R.

In this way, the polygonal line selection unit 6 of the sixth embodiment enables one polygonal-line-shaped slider to be activated among plural polygonal lines so that a user may selectively manipulate a desired object among many objects contained in video data.

SEVENTH EMBODIMENT

Figure 35:
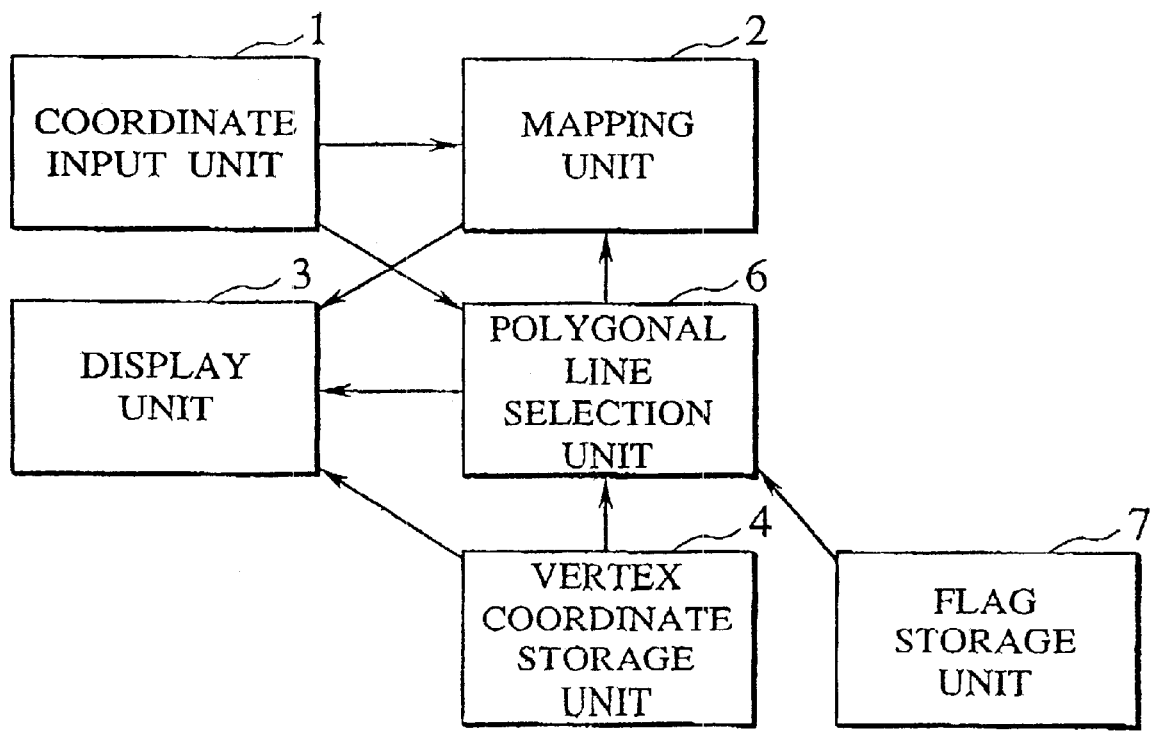
FIG. 35 is a block diagram showing a polygonal-line-shaped slider apparatus according to the seventh embodiment of the present invention.
Figure 36:
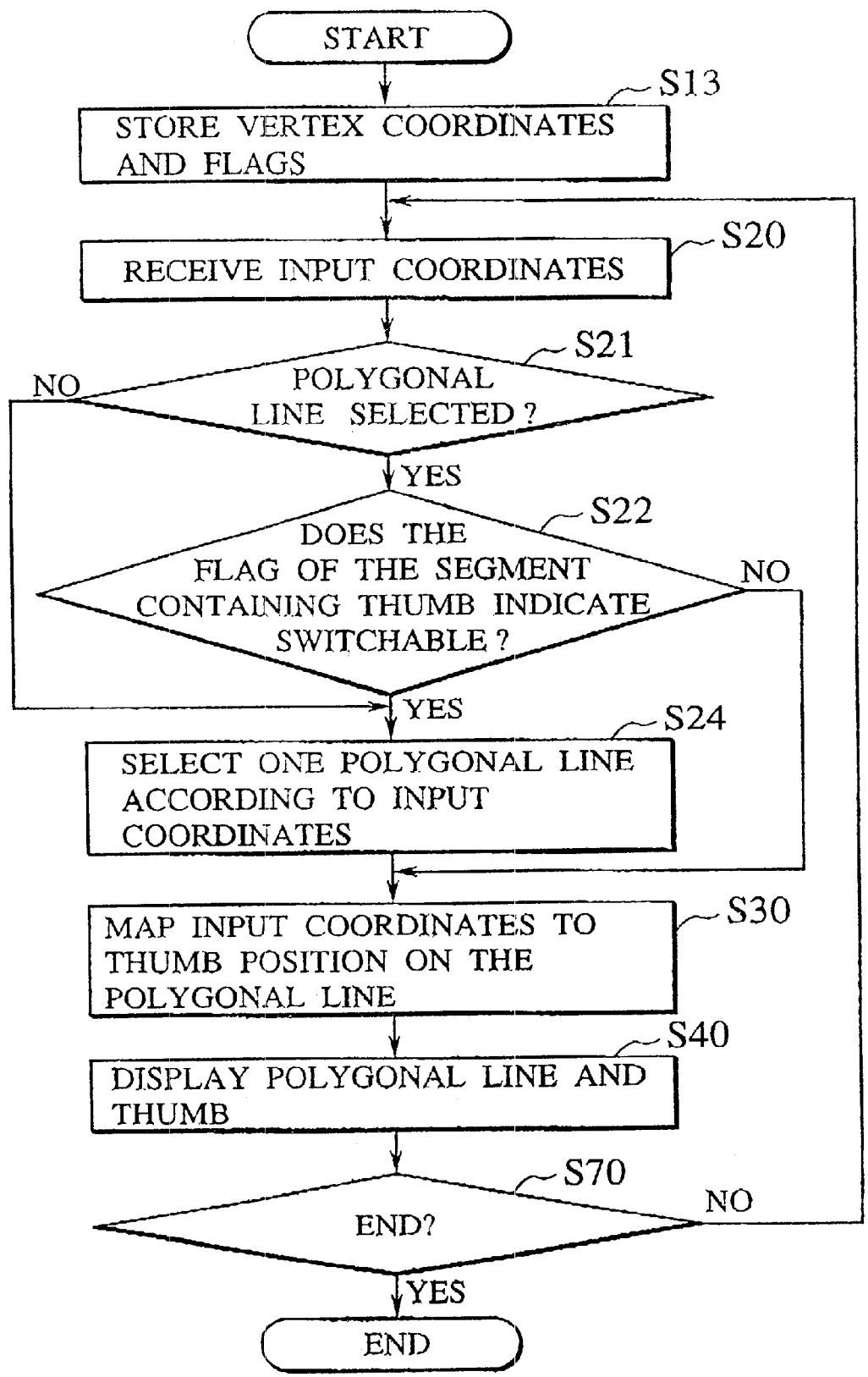
FIG. 36 is a flow chart showing a processing carried out by the apparatus according to the seventh embodiment.
Figures 37, 38:
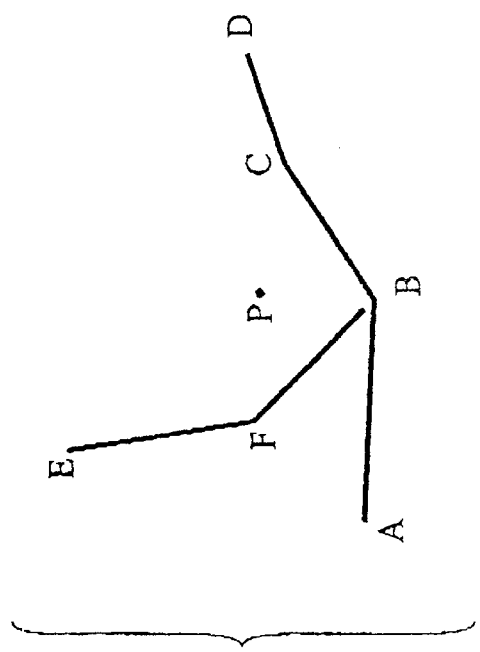
FIG. 37 is a diagram showing vertex data stored in a vertex storage unit of the apparatus according to the seventh embodiment.
FIG. 38 is a diagram showing an exemplary case of merging two sliders according to the eighth embodiment of the present invention.

Referring now to FIG. 35 to FIG. 37, the seventh embodiment of the GUI scheme using a polygonal-line-shaped slider according to the present invention will be described in detail. The seventh embodiment controls whether or not one polygonal-line-shaped slider is switchable to another. The seventh embodiment is a modification of the sixth embodiment in which a flag storage unit 7 is provided in addition to the sixth embodiment of FIG. 31, as shown in FIG. 35.

Whether or not to make the polygonal line switchable to another during the movement of the thumb depends on the usage of the slider, and therefore, the switching of polygonal lines should preferably be controllable flexibly. A polygonal line selection unit 6 of the seventh embodiment controls whether or not the polygonal line is switchable to another using a flag stored in the flag storage unit 7 for each segment of the polygonal line.

Next, the processing for controlling the switching of polygonal lines according to the seventh embodiment will be explained in detail. FIG. 35 shows a configuration of the apparatus according to the seventh embodiment.

In FIG. 35, the apparatus of the seventh embodiment comprises a coordinate input unit 1, a mapping unit 2, a display unit 3, a vertex storage unit 4, the polygonal line selection unit 6, and the flag storage unit 7. The units 1 to 4 are the same as those of the first embodiment of FIG. 3, and the polygonal line selection unit 6 is the same as that of the sixth embodiment of FIG. 31.

FIG. 36 shows a flow chart for a procedure of the processing carried out by the apparatus of FIG. 35. The flag storage unit 7 stores a switching flag for each segment of each polygonal line in a storage medium such as a semiconductor memory or a magnetic disk (step S13). As shown in FIG. 37, the flags may be included in the vertex data stored in the vertex storage unit 4. In FIG. 37, a row containing a vertex number N indicates a switching flag for a segment whose endpoints are vertex "N-1" and vertex N. If the polygonal line is switchable to another, the flag is YES, and if not, the flag is NO. These YES and NO may be represented by numerals 1 and 0, for example.

When the polygonal line selection unit 6 determines that there is a selected polygonal line (step S21Y), the polygonal line selection unit 6 retrieves the flag for a segment where the thumb is present from the flag storage unit 7 and checks the flag (step S22). If the retrieved flag allows the switching of the polygonal line to another (step S22Y), the polygonal line selection unit 6 selects a polygonal line according to the input coordinates at step S24, which is the same as the step S24 of the sixth embodiment. If the retrieved flag prohibits the switching of the polygonal line (step S22N), the polygonal line selection unit 6 selects no other polygonal line, and the processing proceeds to step S30. On the other hand, when there is no selected polygonal line (step S21N), the processing proceeds to step S24. Steps S30 to S70 are the same as those of the sixth embodiment.

In this way, the polygonal line selection unit 6 of the seventh embodiment refers to the flag stored in the flag storage unit 7 and controls the switching of polygonal lines. Thus, the seventh embodiment flexibly determines, for each segment of the polygonal line, whether or not the polygonal line is switchable to another depending on the usage of the slider while moving the thumb along the polygonal line.

EIGHTH EMBODIMENT

Figure 39:
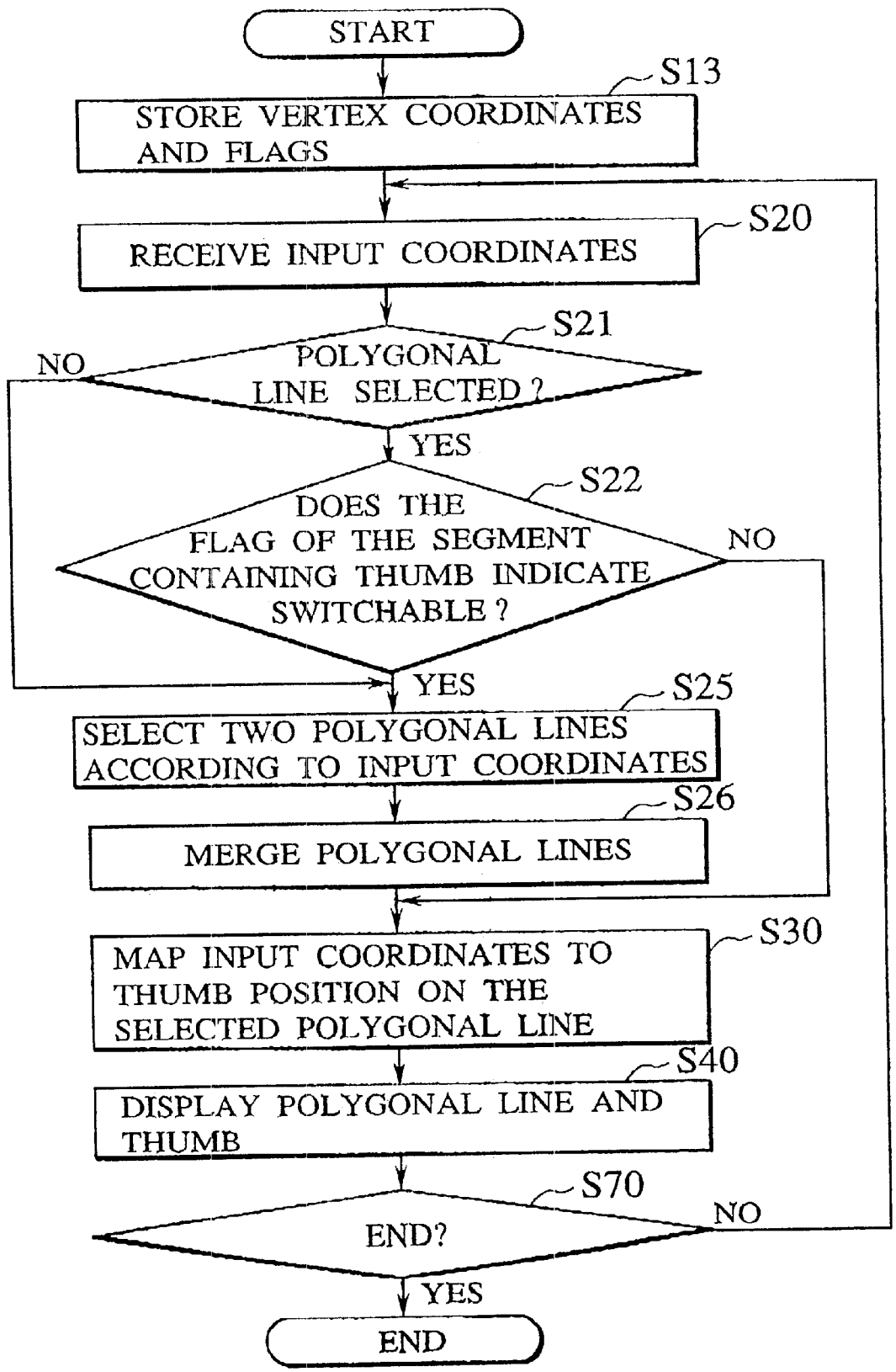
FIG. 39 is a flow chart showing a processing carried out by an apparatus according to the eighth embodiment.

Referring now to FIG. 38 and FIG. 39, the eighth embodiment of the GUI scheme using a polygonal-line-shaped slider according to the present invention will be described in detail. The eighth embodiment merges a plurality of sliders Into one. The configuration of the apparatus of the eighth embodiment is the same as that of FIG. 31.

Next, the processing-for merging plural polygonal-line-shaped sliders according to the eighth embodiment will be explained in detail.

The apparatus of the eighth embodiment comprises a coordinate input unit 1, a mapping unit 2, a display unit 3, a vertex storage unit 4, and a polygonal line selection unit 6. The units 1 to 4 are the same as those of the first embodiment of FIG. 3.

FIG. 38 shows polygonal lines ABCD and EFB that share a vertex B, and FIG. 39 shows a flow chart for a procedure of the processing carried out by the apparatus of the eighth embodiment. In order to position the thumb on a segment FB or BC for an input point P, the polygonal line selection unit 6 selects two polygonal lines ABCD and EFB (step S25). The polygonal line section unit 6 merges the two polygonal lines into one polygonal line EFBCD (step S26). Steps S13 to S22 and steps S30 to 570 are the same as those of the sixth and seventh embodiments.

Compared with the sixth and seventh embodiments that select one polygonal line, the eighth embodiment more smoothly maps the input coordinates to the position of the thumb between the segments FB and BC. When there are plural polygonal lines that share a vertex, the eighth embodiment merges these polygonal lines as one polygonal line so as to smoothly move the thumb along segments that contain the shared vertex.

NINTH EMBODIMENT

Figure 40:
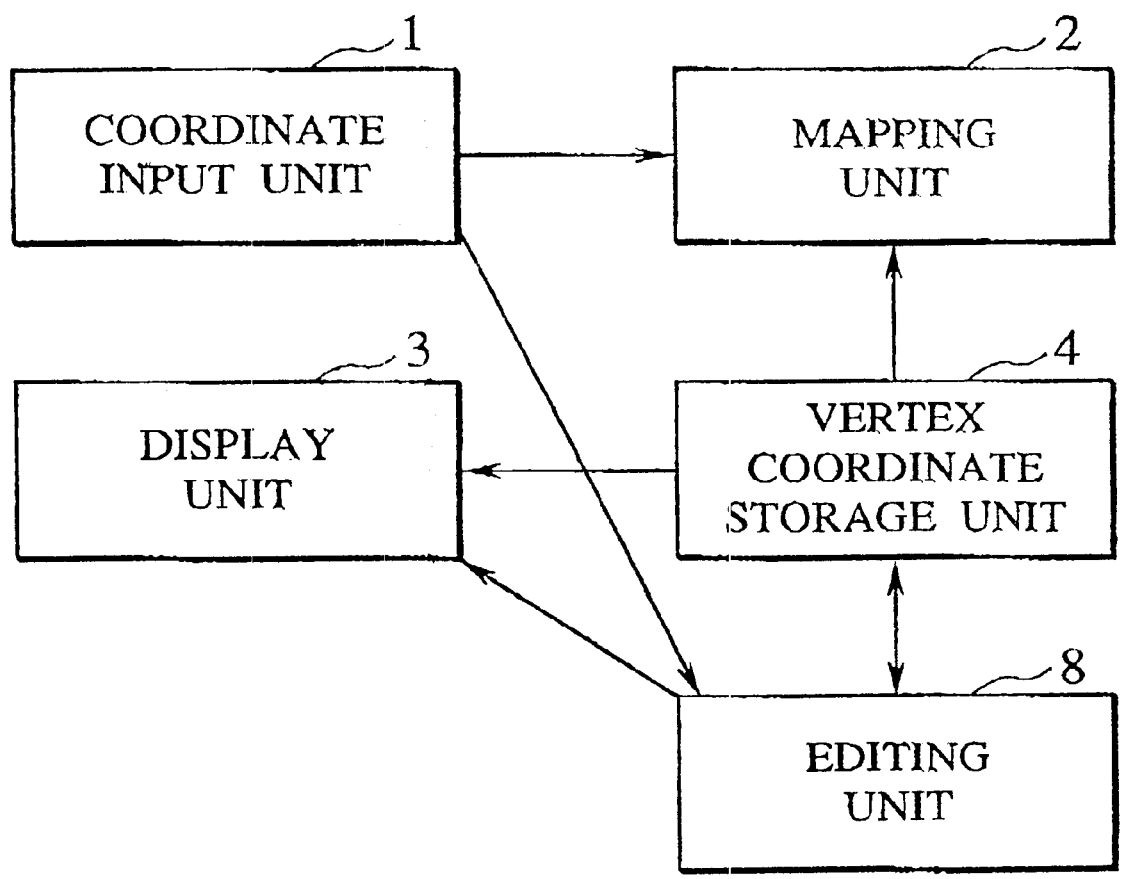
FIG. 40 is a block diagram showing a polygonal-line-shaped slider apparatus according to the ninth embodiment of the present invention.
Figure 41:
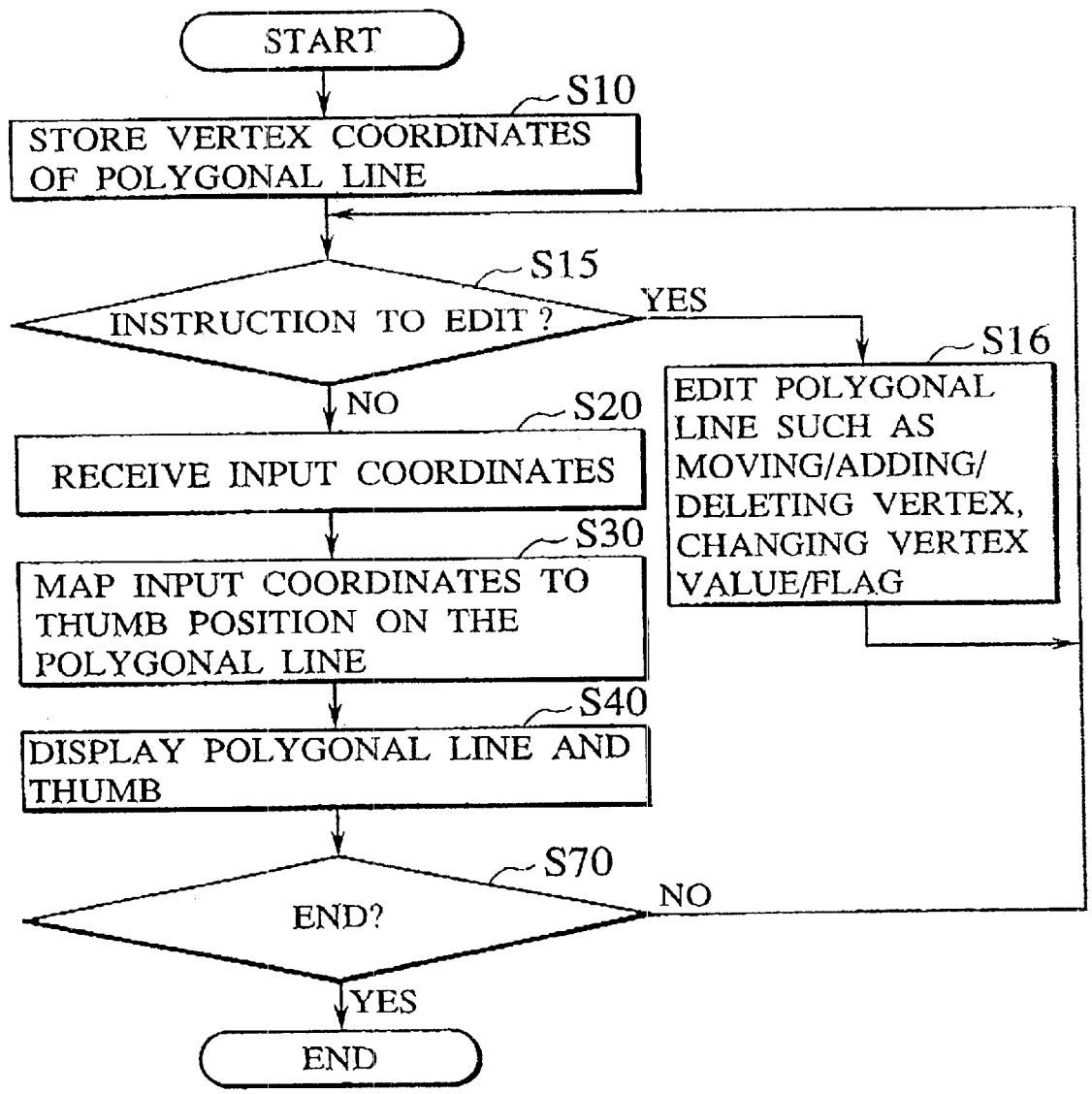
FIG. 41 is a flow chart showing a processing carried out by the apparatus according to the ninth embodiment.
Figure 42:
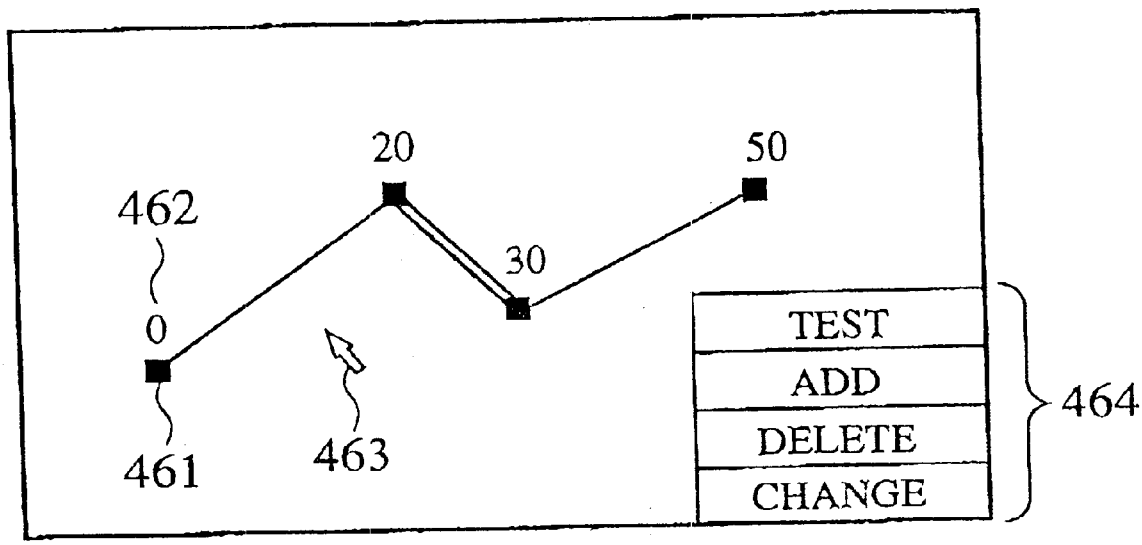
FIG. 42 is a diagram showing a slider editing provided by an editing unit according to the ninth embodiment.
Figure 43:
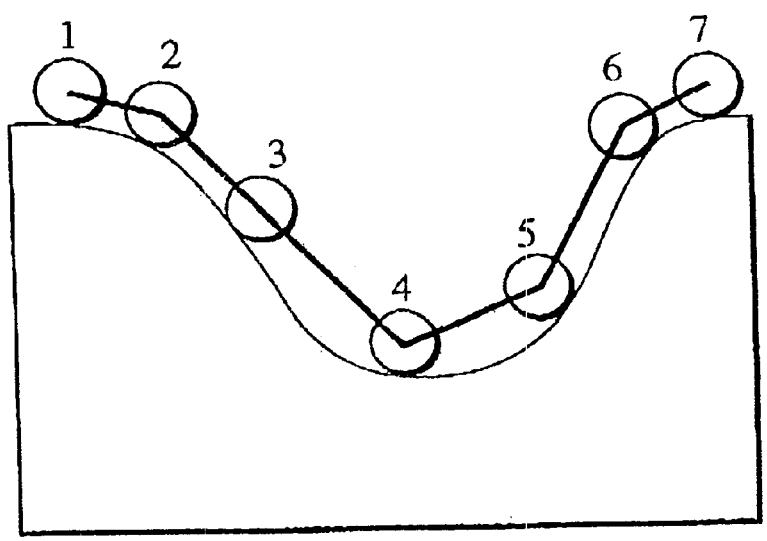
FIG. 43 is a diagram showing an exemplary case of a polygonal line generated by a polygonal line generation unit according to the tenth embodiment of the present invention.

Referring now to FIG. 40 to FIG. 42, the ninth embodiment of the GUI scheme using a polygonal-line-shaped slider according to the present invention will be described in detail. The ninth embodiment edits the polygonal-line-shaped slider. The ninth embodiment adds an editing unit 8 of FIG. 40 to the first embodiment of FIG. 3.

Next, the processing for editing the polygonal-line-shaped slider of the ninth embodiment will be explained in detail.

In FIG. 40, the apparatus of the ninth embodiment comprises a coordinate input unit 1, a mapping unit 2, a display unit 3 a vertex storage unit, and the editing unit 8. The units 1 to 4 are the same as those of the first embodiment of FIG. 3. The display unit 3 is essential for the ninth embodiment. The ninth embodiment may be combined with any one of the above embodiments.

FIG. 41 shows a flow chart for a procedure of the processing carried out by the apparatus of the ninth embodiment. Step S10 is the same as that of the above embodiments. When it Is determined that a user has entered an instruction to edit the polygonal line (S15Y), the editing unit 8 uses the input coordinates provided by the coordinate input unit 1 to move vertexes, change values assigned to vertexes, add vertexes, or delete vertexes. In this way, the editing unit 8 changes contents of the vertex data in the vertex storage unit 4 (step S16). The editing work carried out by the editing unit 8 may be realized by using the known techniques such as CAD and drawing tools. Steps S30 to S70 are the same as those of the above embodiments.

FIG. 42 shows an exemplary display of an editing screen according to the ninth embodiment. The polygonal line has vertexes, each of which is provided with a handle 461 and a vertex value 462. A cursor 463 is used to move the handle 461 in order to arbitrarily determine the coordinates of the vertexes. Each segment between the adjacent vertexes is represented by a single line or double lines to indicate the value of a switching flag attached to that segment. The user manipulates buttons 464 to test the operation of the slider, add/delete vertexes, or change the values assigned to the vertexes or the flags. When adding a new vertex to a segment extending between two vertexes that have assigned values, it is preferable to automatically assign the new vertex with a value that is in a middle of the assigned values of the existing vertexes.

In this way, the editing unit 8 of the ninth embodiment is capable of arbitrarily editing the coordinates and values of vertexes of the polygonal line according to data entered through the coordinate input unit 1, so that the user can adjust the polygonal-line-shaped slider suitably according to the desired object manipulation.

TENTH EMBODIMENT

Referring now to FIG. 43 to FIG. 55, the tenth embodiment of the GUI scheme using a polygonal-line-shaped slider according to the present invention will be described in detail. The tenth embodiment automatically generates or corrects the polygonal-line-shaped slider. The tenth embodiment is a modification of the ninth embodiment in which the edition unit 8 of the ninth embodiment of FIG. 40 is replaced by an editing unit 8 of FIG. 44 that includes a polygonal line generation unit 801 and a polygonal line correction unit 802. The units 801 and 802 may be provided separately outside the editing unit 8. In this case, the tenth embodiment may omit the editing unit 8.

The polygonal-line-shaped slider can be formed by approximating a trajectory of an object moving in video data, or a trajectory of a screen view that moves in response to camera movement, so that the user can follow the movement of the object or screen view by using the polygonal-line-shaped slider, and control the video data playback. The tenth embodiment automatically generates the polygonal line onto which the trajectory of an object is projected.

Next, the processing for generating the polygonal-line-shaped slider by the apparatus of the tenth embodiment will be explained.

Figure 44:
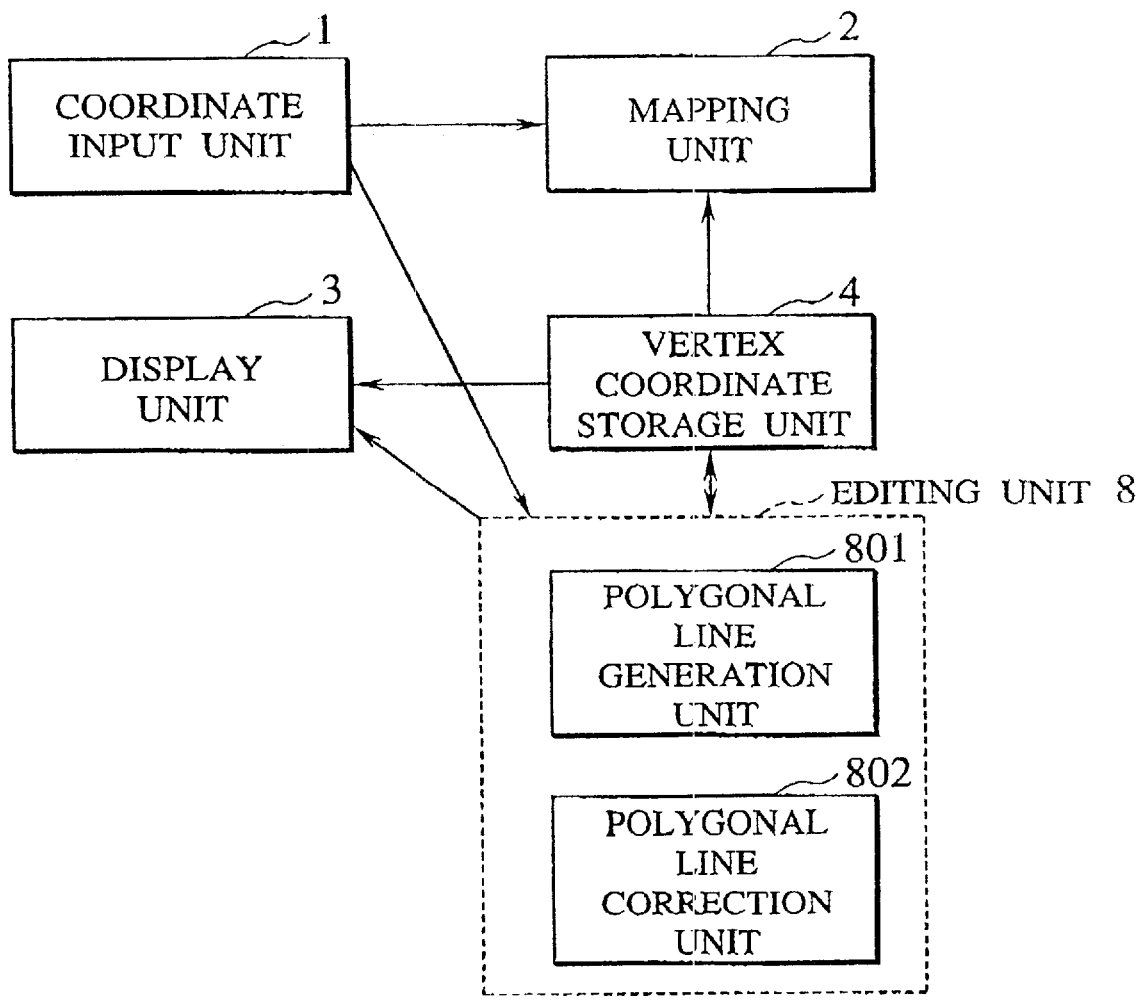
FIG. 44 is a block diagram showing a polygonal line shaped slider apparatus according to the tenth embodiment.

FIG. 44 shows a configuration of the apparatus according to the tenth embodiment.

The polygonal line generation unit 801 analyzes the movement of the object or screen view and automatically generates the polygonal line. For example, in FIG. 43, a ball rolls along a slope as indicated by numerals 1 to 7. The polygonal line generation unit 801 extracts the movement of the ball and generates the polygonal line passing through the points 1 to 7. To extract the movement of an object, the known techniques such as a block matching technique and an optical flow technique may be employed. The polygonal line generation unit 801 automatically generates the polygonal line according to the movement of the object or screen view so that time and effort to generate the polygonal line can be reduced.

Figure 45A:
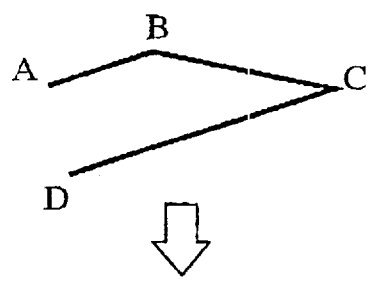
FIGS. 45A and 45B are diagrams showing exemplary cases of the vertex dividing carried out by a polygonal line correction unit according to the tenth embodiment.
Figure 45B:
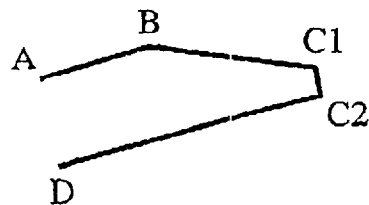

The polygonal line generated by the polygonal line generating unit 801 may be in a complicated shape such as zigzag shape. The polygonal line correction unit 802 makes such automatically or manually generated polygonal line smooth. FIG. 45A shows a polygonal line ABCD having an acute vertex C. The acute vertex hinders smooth mapping between the input coordinates and the thumb that is moved along the polygonal line. The polygonal line correction unit 802 according to the tenth embodiment divides the acute vertex C into vertexes C1 and C2 as shown in FIG. 45B. At this point, the vertexes C1 and C2 are set to have non-acute vertex angles.

Figure 46:
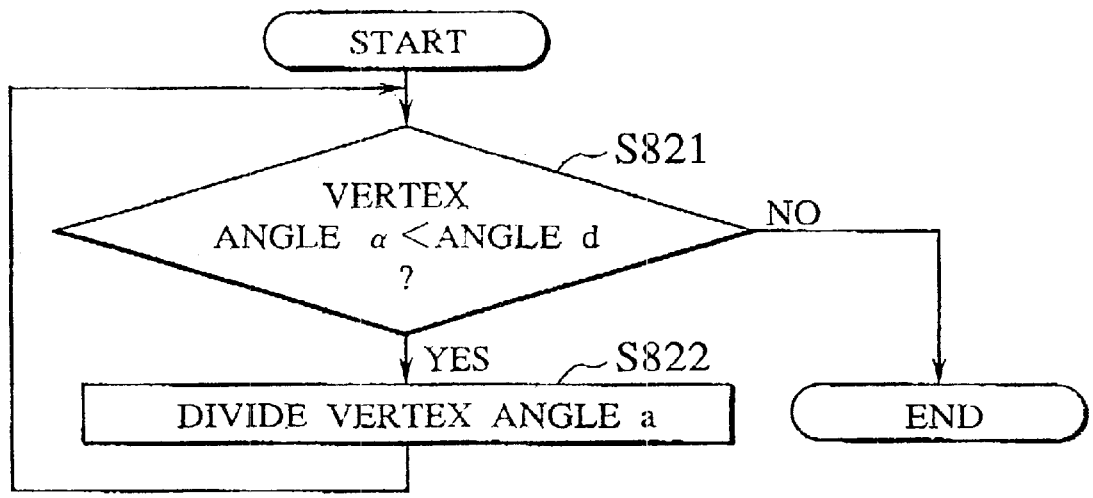
FIG. 46 is a flow chart showing a vertex dividing processing carried out by polygonal line correction unit according to the tenth embodiment.
Figure 47A:
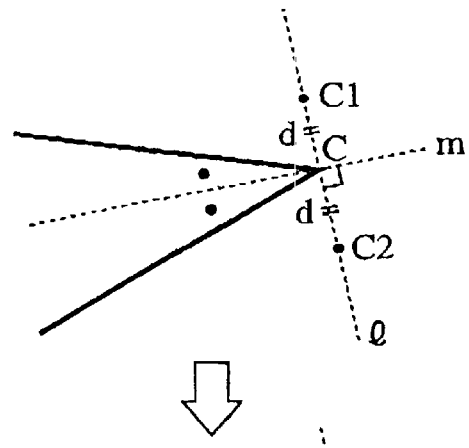
FIGS. 47A and 47B are diagrams showing the vertex dividing carried out by polygonal line correction unit according to the tenth embodiment.
Figure 47B:
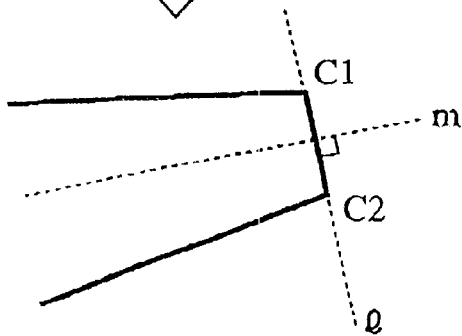

FIG. 46 shows a flow chart for a procedure of the smoothing processing carried out by the polygonal line correction unit 802. The polygonal line correction unit 802 examines each vertex of the polygonal line to see if it is smaller than a threshold α and extracts a vertex "a" whose angle is smaller than α (step S821). In FIG. 47A, the polygonal line correction unit 802 extracts a vertex C whose angle Is smaller than α. A line l that is passing through the vertex C and perpendicular to a bisector m of the vertex C is generated. Two points C1 and C2 on the line l that are away from the vertex C by a distance "d" are obtained. The polygonal line correction unit 82 divides the vertex C into vertexes C1 and C2 (step S822). The distance d is set so that the vertex angles of the vertexes C1 and C2 are not acute. The dividing process is repeated until there is no acute vertex on the polygonal line. This smoothing processing eliminates acute vertexes from the polygonal line and continuously and smoothly maps the input coordinates to the position of the thumb that is moved along the polygonal line, so that the handling of the slider can be improved.

Figure 49A:
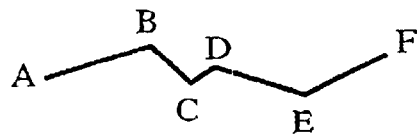
FIGS. 49A and 49B are diagrams showing an exemplary case of vertex merging carried out by polygonal line correction unit according to the tenth embodiment.
Figure 49B:
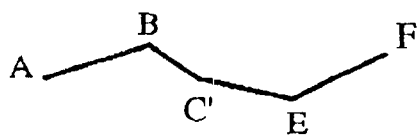

FIG. 48 shows a flow chart for a procedure of another smoothing processing carried out by the polygonal line correction unit 802. This process combines adjacent vertexes into one. FIG. 49A shows a polygonal line ABCDEF having adjacent vertexes C and D. The polygonal line correction unit 802 combines the vertexes C and D into a vertex C as shown in FIG. 49B.

The polygonal line correction unit 802 obtains adjacent vertexes "a" and "b" whose distance is shorter than a threshold "d" (step S824). If it is determined that the vertex "a" is an endpoint of the polygonal line (step S825Y), the polygonal line correction unit 802 deletes the vertex "b" that is not an endpoint (step S826). If it is determined that the vertex "b" is an endpoint (step S828), the polygonal line correction unit 802 deletes the vertex "a" that is not an endpoint (step S828). If it Is determined that either one of the vertexes "a" and "b" is not an endpoint (step S827N), the polygonal line correction unit 802 moves the vertex "a" to the midpoint between the vertexes "a" and "b", assigns an average of values assigned to the vertexes "a" and "b" to the new vertex "a", and deletes the vertex "b" (step S829). The above processing is repeated until there are no adjacent vertexes whose distance is shorter than "d" (step S824N). Although this processing does not move an endpoint of the polygonal line and keeps the position and value of each endpoint, it is possible to carry out the same processing on each endpoint as well. The position and value of one of vertexes "a" or "b" may be left unchanged while the other vertex is simply deleted. This smoothing processing makes the polygonal line smooth so that the handling can be improved, and reduces the number of vertexes so that data amount and calculations can be reduced and therefore the sliding speed of the thumb along the polygonal line can be made faster. The other processing of the tenth embodiment is the same as that of the above embodiments.

As mentioned above, the polygonal line generation unit 801 of the tenth embodiment generates the polygonal-line-shaped slider that approximates the trajectory of an object or the trajectory of a motion of a screen view in video data. The tenth embodiment automatically generates the polygonal-line-shaped slider corresponding to the movement of an object or a screen view so that time and effort to edit the polygonal line can be reduced Also, the polygonal line correction unit 802 of the tenth embodiment makes the shape of the polygonal-line-shaped slider smooth so that the thumb can move along the polygonal line smoothly, and the handling can be improved. In particular, the handling improvement is noticeable when the slider automatically generated by the polygonal line generation unit 801 has a complicated shape such as zigzag shape.

Next, referring to FIG. 50 to FIG. 54, exemplary applications of the GUI using the polygonal-line-shaped slider according to the present invention will be explained. Each polygonal-line-shaped slider mentioned below is capable of interactively controlling the playback of video data.

Figure 50A:
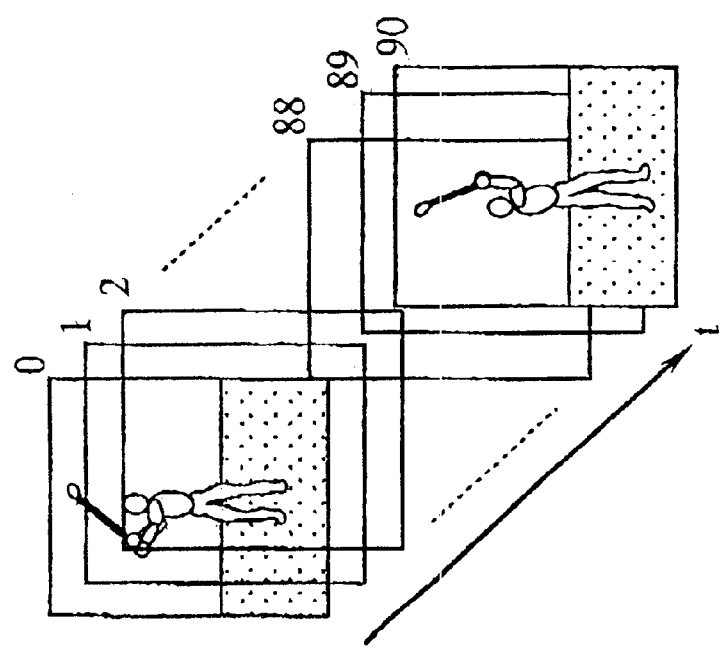
FIGS. 50A and 50B are diagrams showing one exemplary case of video playback control using the polygonal-line-shaped slider of the present invention.
Figure 50B:
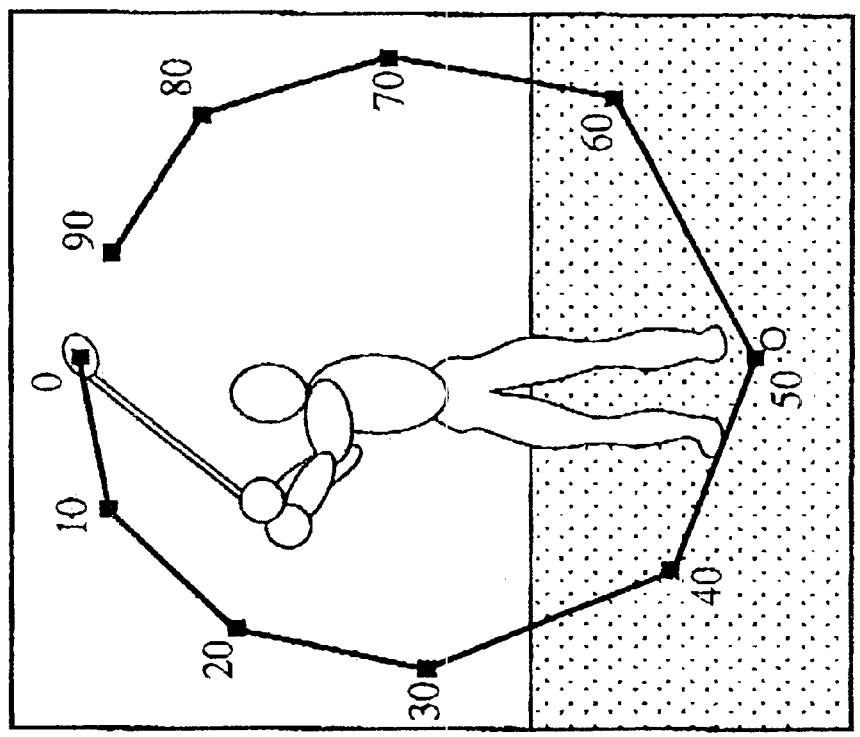

FIGS. 50A and 50B show video data of a golf swing playbacked on a screen, as an exemplary case of controlling the playback of video data according to any one of the embodiments mentioned above. In FIG. 50A, the frame images have frame numbers 0 to 90. In FIG. 50B, the any one of the above embodiments generates the polygonal-line-shaped slider that approximates the trajectory of a motion of a golf club. A value assigned to each vertex of the polygonal line corresponds to a position on time axis, such as a frame number to be playbacked or a time code. A user moves the thumb along the polygonal-line-shaped slider to arbitrarily display a frame image corresponding to a value provided by the slider through the output unit 5. The user can intuitively manipulate and randomly playback the video data at variable speed as if the user is grabbing and moving the golf club. Since the moving direction of the object and that of the thumb on the slider match with each other, the user can continuously playback the video data by direct manipulation.

Figures 51A, 51B:
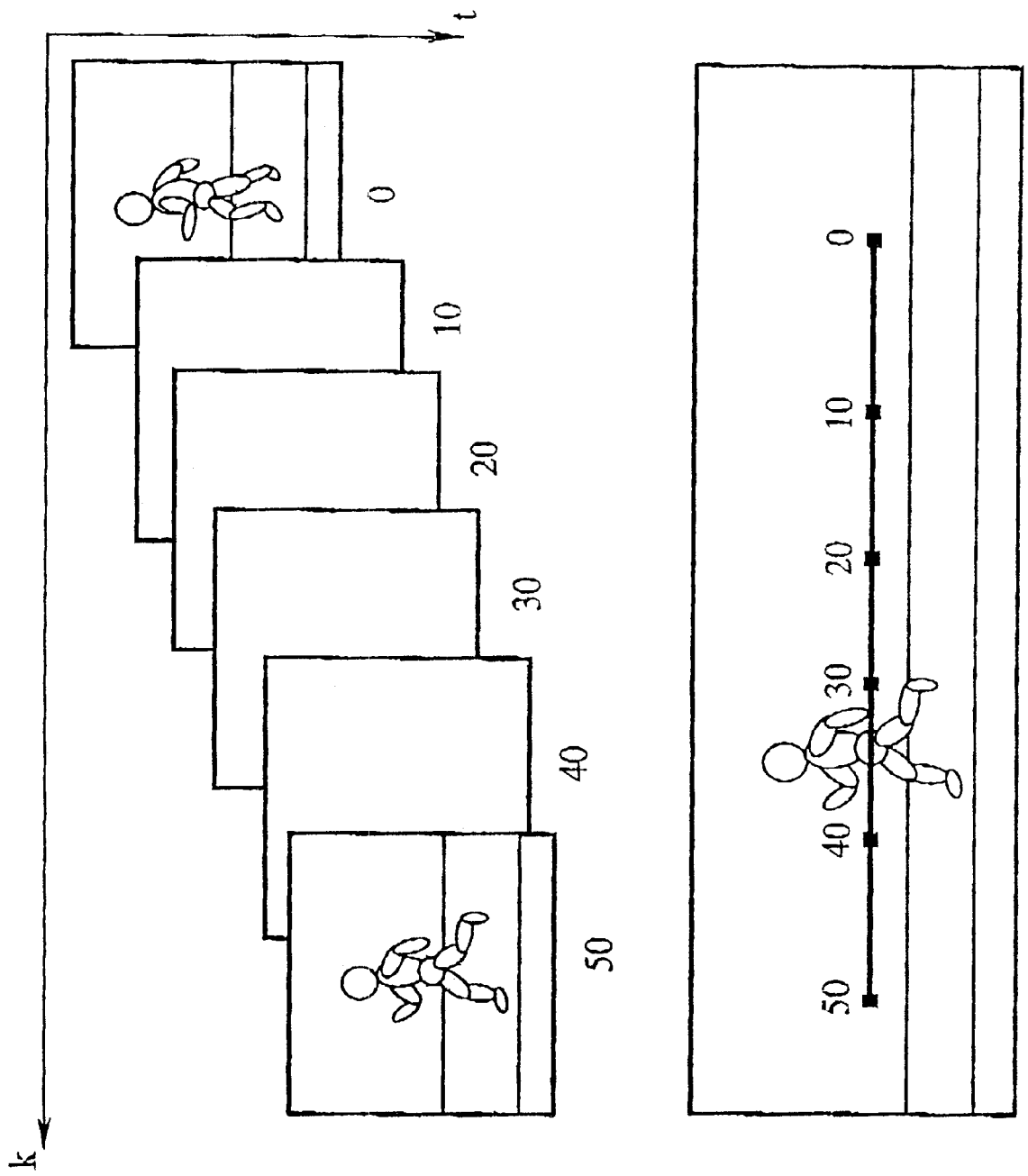
FIGS. 51A and 51B are diagrams showing another exemplary case of video playback control using the polygonal-line-shaped slider of the present invention.

FIGS. 51A and 51B show another exemplary case of controlling the video data playback according to the any one of the above embodiments. In this example, a screen view moves as a camera moves. In FIG. 51A, an athlete is running along a track and there are image frames 0 to 50. As the athlete moves, the camera moves to the left. FIG. 51B shows a synthesized panoramic background. The embodiment generates the polygonal-line-shaped slider that approximates the trajectory of the frame center spot or the position of the athlete in frame images. A user moves the thumb along the polygonal-line-shaped slider to display an arbitrary frame image corresponding to a value provided by the slider on the panoramic background. Accordingly, the user can intuitively manipulate and playback the video data as if the user is grabbing and moving the athlete.

Figure 52:
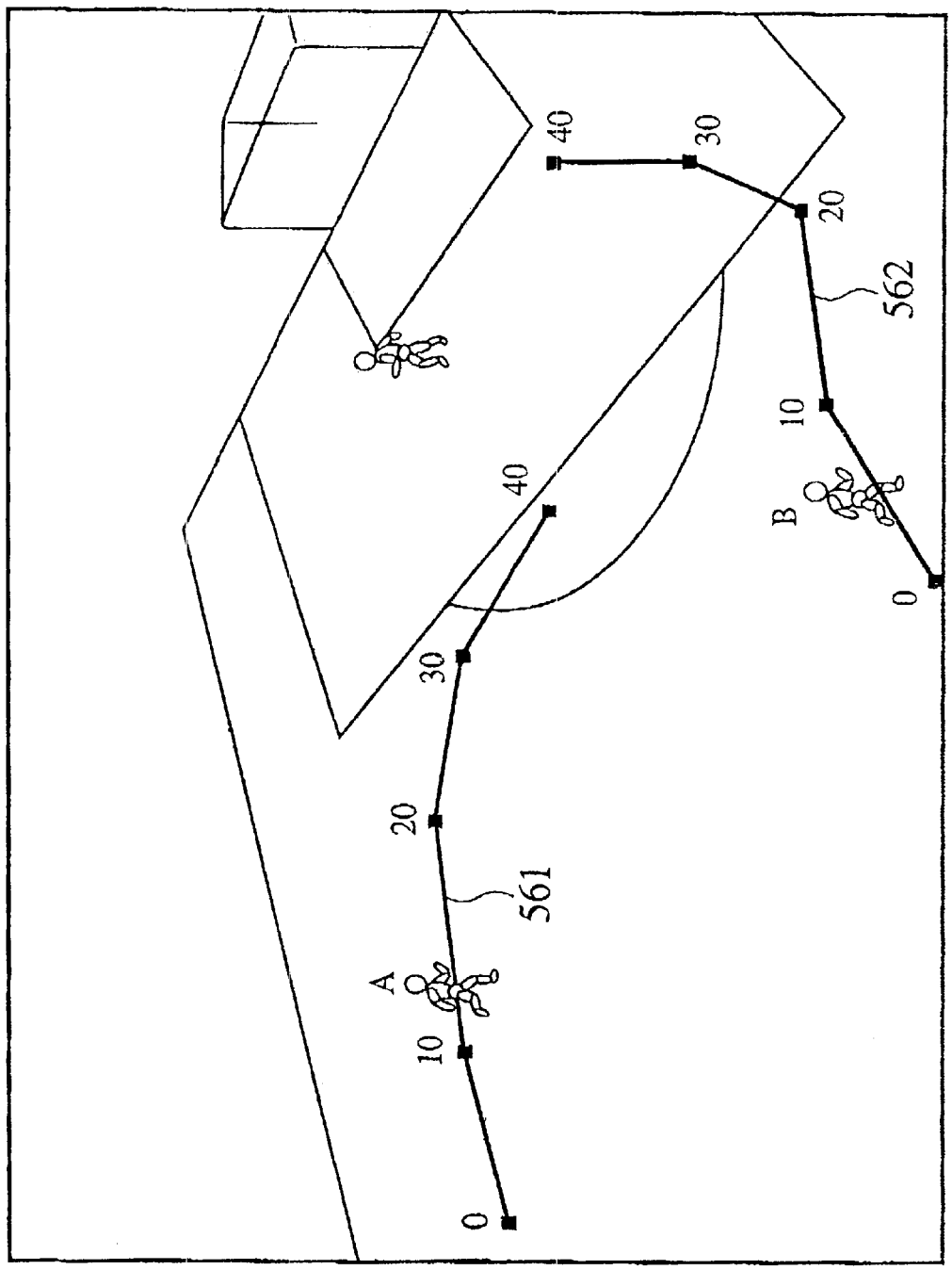
FIG. 52 is a diagram showing another exemplary case of video playback control using the polygonal-line-shaped slider of the present invention.

FIG. 52 shows still another exemplary case of controlling the video data playback according to the any one of the above embodiments. In FIG. 52, the images contain plural moving objects, i.e., two succor players A and B who are running. The embodiment generates the polygonal-line-shaped sliders 561, 562 that approximate the trajectories of motions of the players A and B, respectively. Values assigned to vertexes of the polygonal lines represent image frame numbers to be playbacked. A user moves the thumb along any one of the polygonal-line-shaped sliders to display an arbitrary frame image corresponding to a value provided by the slider. Accordingly, the user can intuitively playback the video data as if the uses is grabbing and moving the players. Since the plural sliders are respectively assigned to the plural objects, the user can control a single video data according to plural time axes. For example, the user can switch a manipulation target object to a specific player or a ball when playbacking the images.

Figure 53:
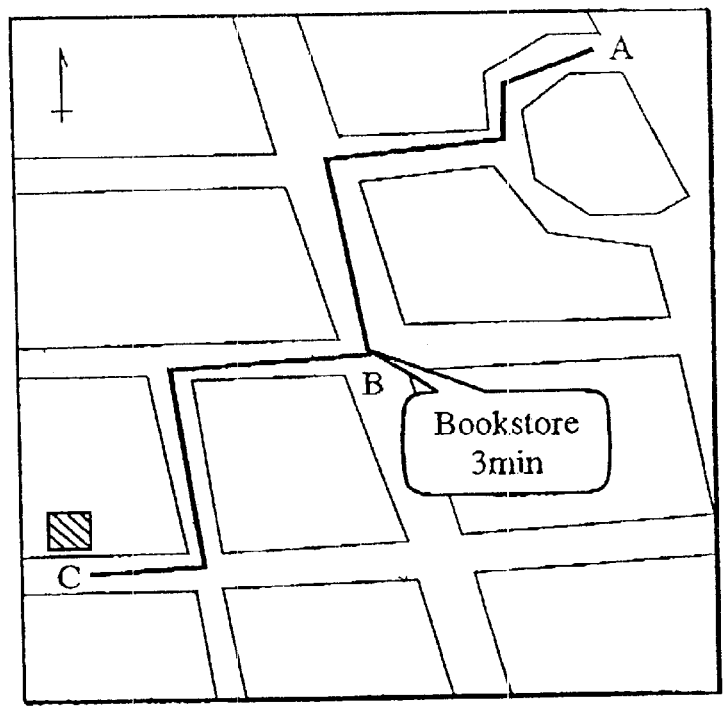
FIG. 53 is a diagram showing an exemplary case of map information guidance using the polygonal-line-shaped slider of the present invention.

FIG. 53 shows an exemplary case of displaying a route information guidance according to any one of the above embodiments. In this example, the embodiment generates the polygonal-line-shaped slider that approximates a route from a spot A to a spot C on a map. A value assigned to a vertex of the polygonal line represents an elapsed time along the route or corresponding information. A balloon shows an elapsed time of three minutes and indicates that there is a bookstore. When a user moves the thumb along the polygonal-line-shaped slider, the user can see the elapsed time and information at each spot along the route continuously.

Figure 54A:
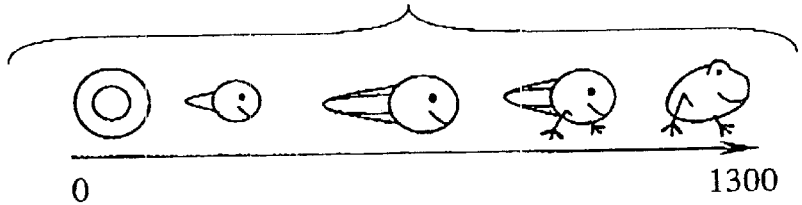
FIGS. 54A and 54B are diagrams showing an exemplary case of animation data playback using the polygonal-line-shaped slider of the present invention.
Figure 54B:
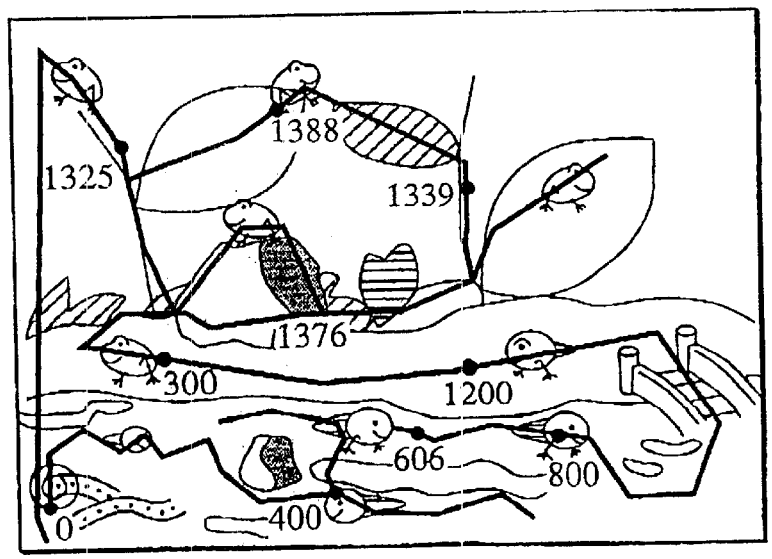

FIGS. 54A and 54B show an exemplary case of controlling the animation data according to any one of the above embodiments. In this example, the embodiment controls an animation of a growth of a frog. In FIG. 54A, there are image frames 0 to 1300 showing the growth stages of the frog. The tenth embodiment arranges the polygonal-line-shaped slider on a background in FIG. 54B and maps values assigned to vertexes to the frame numbers of FIG. 54A. A user moves the thumb along the polygonal-line-shaped slider, and an image corresponding to a value provided by the slider is displayed at the position of the thumb. Consequently, the user can intuitively playback the animation as if the user is grabbing and moving the frog. The exemplary applications mentioned above are achievable not only by the tenth embodiment but also by any one of the above embodiments.

Figure 55A:
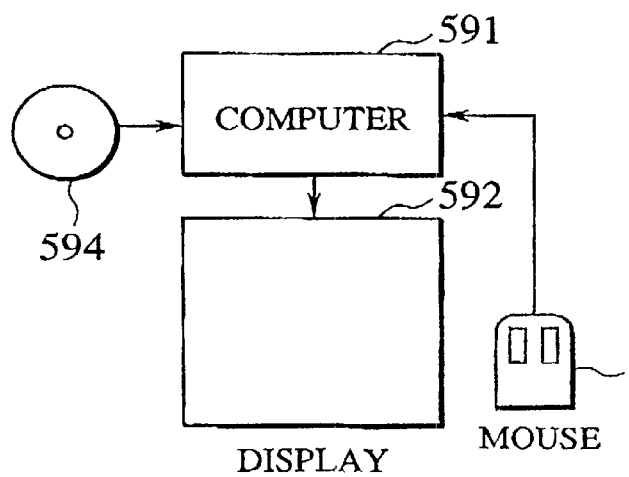
FIGS. 55A and 55B are diagrams showing hardware structures for realizing the polygonal-line-shaped slider of the present invention.
Figure 55B:
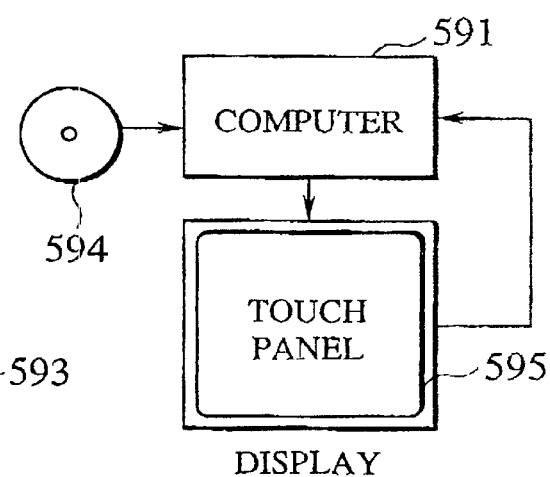

FIGS. 55A and 55B show computers that implement the processing of any one of the embodiments mentioned above.

Each computer 591 has a display device 592 such as a CRT or an LCD, an input device such as a mouse 593 or a touch panel 595, and a storage device. A program to execute the processes of the present invention can be recorded in a computer-readable recording medium 594 such as a magnetic disk, an optical disk, and a CD-ROM. The program may be distributed in the recording medium, and the recording medium is read and executed by the computers.

The present invention may employ a ring slider having a start point and an end point at the same position. The present invention may employ a three-dimensional polygonal-line-shaped slider. In this case, the present invention maps an input point having three-dimensional coordinates to the thumb on the three-dimensional polygonal line using perpendicular planes and bisectional planes instead of two-dimensional lines.

To smoothly map the input coordinates to the thumb, the mapping unit 2 of the present invention may employ potential lines such as lines of electric or magnetic force.

In summary, the present invention provides a graphical user interface that is capable of intuitively manipulating spatio-temporal media data such as video data without deteriorating the temporal continuity of the data.

It is to be noted that, besides those already mentioned above, many modifications and variations of the embodiments may be made without departing from the novel and advantageous features of the present invention. Accordingly, all such modifications and variations are intended to be included within the scope of the appended claims.

What is claimed is:

1. A method of entering data corresponding to specified coordinates, comprising the steps of:
    (a) storing coordinates of vertexes which define a polygonal line shaped slider that is composed of a polygonal line formed by at least two segments and a coordinate indicator to be moved along the polygonal line;
    (b) storing input coordinates; and
    (c) mapping the input coordinates onto a nearest point on the polygonal line which is substantially nearest to the input coordinates and positioning the coordinate indicator at the nearest point.

2. The method of claim 1, wherein the step (c) maps the input coordinates onto the point on the polygonal line by projecting the input coordinates on the polygonal line.

3. The method of claim 1 wherein the step (c) positions the position of an intersection point which is nearest to the input coordinates at a position of the coordinate indicator, the intersection point being selected from intersection points of each segment and a perpendicular line from the input coordinates to the each segment of the polygonal line.

4. The method of claim 1, wherein the step (c) includes the steps of:
    (c1) extending a perpendicular line from the input coordinates to each segment of the polygonal line;
    (c2) finding an intersection point of the perpendicular line and each segment and calculating, for each segment, a ratio of a length of a partial segment divided by the intersection point with respect to a length of each segment;
    (c3) calculating a distance between the input coordinates and each intersection point; and
    (c4) selecting one of intersection points whose distance as obtained by the step (c3) is smallest among intersection points whose ratio as calculated by the step (c2) is within a range of 0 to 1.

5. The method of claim 1, wherein the step (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, calculates a distance between the input coordinates and each one of the two end lines of a selected segment and calculates a ratio of calculated distances, and positions the coordinate indicator at a point that internally divides the selected segment at a calculated ratio.

6. The method of claim 1, wherein the step (c) includes the steps of:
(c11) generating, for both vertexes (P1, P2) of each segment of the polygonal line, end lines (L1, L2) each of which is a bisector line of a vertex angle or a perpendicular line passing through a vertex;
(c12) determining, for each of the vertexes (P1, P2), whether or not each one of the vertexes and the input coordinates are on same side of an end line passing through another one of the vertexes;
(c13) calculating a distance between the input coordinates and each segment;
(c14) selecting one segment (L3) which is nearest to the input coordinates from those segments which are determined by the step (c12) as having one vertex on the same side as the input coordinates of the end line passing through another vertex:
(c15) calculating distances (D1, D2) between the input coordinates and the end lines (L1, L2) passing through the vertexes of said one segment (L3) selected by the step (c14); and
(c16) positioning the coordinate indicator at a point that internally divides said one segment (L3) at a ratio (D1:D2) of the distances calculated by the step (c15).

7. The method of claim 1, wherein the step (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtain an intersection point of the parallel line and each one of the two end lines of the selected segment, calculates distances between the input coordinates and obtained intersection points and obtains a ratio of calculated distance, and positions the coordinate indicator at a point that internally divides the selected segment at a calculated ratio.

8. The method of claim 1, wherein the step (c) includes the steps of:
(c21) generating, for both vertexes (P1, P2) of each segment of the polygonal line, end lines (L1, L2) each of which is a bisector line of a vertex angle or a perpendicular line passing through a vertex;
(c22) determining, for each of the vertexes (P1, P2), whether or not each one of the vertexes and the input coordinates are on same side of an end line passing through another one of the vertexes;
(c23) calculating a distance between the input coordinates and each segment;
(c24) selecting one segment (L3) which is nearest to the input coordinates from those segments which are determined by the step (c22) as having one vertex on the same side as the input coordinates of the end line passing through another vertex;
(c25) generating a parallel line (L4) that is parallel to said one segment (L3) and passing through the input coordinates;
(c26) finding intersection points (Q1, Q2) of the parallel line (L4) and the end lines (L1, L2) of said one segment (L3);
(c27) calculating distances (D1, D2) between the input coordinates and the intersection points (Q1, Q2); and
(c28) positioning the coordinate indicator at a point that internally divides said one segment (L3) at a ratio (D1:D2) of the distances calculated by the step (c15).

9. The method of claim 3, wherein when a position of the coordinate indicator is indeterminable, the step (c) positions the coordinate indicator at one of the vertexes of the polygonal line that is nearest to the input coordinates.

10. The method of claim 5, wherein when a position of the coordinate indicator is indeterminable, the step (c) positions the coordinate indicator at one of the vertexes of the polygonal line that is nearest to the input coordinates.

11. The method of claim 7, wherein when a position of the coordinate indicator Is indeterminable, the step (c) positions the coordinate indicator at one of the vertexes of the polygonal line that is nearest to the input coordinates.

12. The method of claim 1, wherein the step (c) positions the coordinate indicator at the point when a distance between the input coordinates and the polygonal line is within a prescribed threshold.

13. The method of claim 1, further comprising the step of:
(d) providing data corresponding to a position of the coordinate indicator.

14. The method of claim 13, wherein the step (d) provides data corresponding to a ratio at which the position of the coordinate indicator internally divides the polygonal line.

15. The method of claim 13, wherein the step (d) includes the steps of:
(d1) storing data corresponding to the vertexes of the polygonal line; and
(d2) acquiring data (V1, V2) corresponding to both vertexes of one segment on which the coordinate indicator is positioned, and calculating a ratio at which the position of the coordinate indicator internally divides said one segment;
(d3) calculating data corresponding to the ratio calculated by the step (d2) according to acquired data (V1, V2), and providing calculated data.

16. The method of claim 1, further comprising the step of:
(e) selecting one polygonal line from a plurality of polygonal lines.

17. The method of claim 16, wherein the step (e) selects one polygonal line containing a segment that is nearest to the input coordinates.

18. The method of claim 16, wherein the step (e) selects one polygonal line having a coordinate indicator that is nearest to the input coordinates.

19. The method of claim 16, further comprising the step of:
(f) storing, for each segment of each polygonal line, a flag indicating whether or not each polygonal line is switchable to another polygonal line at each segment;
wherein the step (e) refers to the flag of one segment of one polygonal line on which the coordinate indicator is positioned when determining whether or not said one polygonal line is to be switched to another polygonal line.

20. The method of claim 1, further comprising the step of:
(g) merging polygonal lines that share a vertex into one.

21. The method of claim 1, further comprising the step of:
(h) displaying the polygonal line and the coordinate indicator.

22. The method of claim 1, further comprising the step of:
(i) editing the polygonal line according to the input coordinates stored by the step (b).

23. The method of claim 1, further comprising the step of:
(j) smoothing a shape of the polygonal line.

24. The method of claim 23, wherein the step (j) includes the steps of:
(j1) extracting a vertex whose vertex angle is smaller than a prescribed threshold ($\alpha$) from the vertexes of the polygonal line; and
(j2) dividing an extracted vertex into at least two vertexes each having a vertex angle greater than the threshold.

25. The method of claim 23, wherein the step (j) includes the steps of:
(j11) extracting a pair of adjacent vertexes whose distance is shorter than a prescribed threshold (d) from the vertexes of the polygonal line; and
(j12) merging extracted vertexes into one vertex.

26. The method of claim 1, further comprising the step of:
(k) generating a polygonal line that approximates a trajectory of a moving object contained in video data or a trajectory of a motion of a screen view.

27. A method of interactively manipulating video data, comprising the steps of:
(l) sliding a coordinate indicator along a polygonal line formed by, at least two segments using a polygonal line shaped slider composed of the polygonal line and the coordinate indicator according to input coordinates; and
(m) presenting the video data of an image frame corresponding to a position of the coordinate indicator, wherein the coordinate indicator is positioned at a nearest point on the polygonal line which is substantially nearest to the input coordinates.

28. The method of claim 27, further comprising the step of:
(n) presenting the polygonal line over the video data.

29. The method of claim 27, further comprising the step of:
(o) generating a polygonal line that approximates a trajectory of an moving object contained in the video data or a trajectory of a motion of a screen view.

30. An apparatus for entering data corresponding to specified coordinates, comprising:
(a) a unit for storing coordinates of vertexes which define a polygonal line shaped slider that is composed of a polygonal line formed by at least two segments and a coordinate indicator to be moved along the polygonal line;
(b) a unit for storing input coordinates; and
(c) a unit for mapping the input coordinates onto a nearest point on the polygonal line which is substantially nearest to the input coordinates and positioning the coordinate indicator at the nearest point.

31. The apparatus of claim 30, wherein the unit (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtain an intersection points of the parallel and each one of the two end lines of the selected segment, calculates distances between the input coordinates and obtained intersection points and obtains a ratio of calculated distances, and positions the coordinate indicator at a point that internally divides the selected segment at a calculated ratio.

32. The apparatus of claim 30, wherein the unit (c) includes:
(c21) a unit for generating, for both vertexes (P1, P2) of each segment of the polygonal line, end lines (L1, L2) each of which is a bisector line of a vertex angle or a perpendicular line passing through a vertex;
(c22) a unit for determining, for each of the vertexes (P1, P2), whether or not each one of the vertexes and the input coordinates are on same side of an end line passing through another one of the vertexes;
(c23) a unit for calculating a distance between the input coordinates and each segment;
(c24) a unit for selecting one segment (L3) which is nearest to the input coordinates from those segments which are determined by the unit (c22) as having one vertex on the same side as the input coordinates of the end line passing through another vertex;
(c25) a unit for generating a parallel line (L4) that is parallel to said one segment (L3) and passing through the input coordinates;
(c26) a unit for finding intersection points (Q1, Q2) of the parallel line (L4) and the end lines (L1, L2) of said one segment (L3);
(c27) a unit for calculating distances (D1, D2) between the input coordinates and the intersection points (Q1, Q2); and
(c28) a unit for positioning the coordinate indicator at a point that internally divides said one segment (L3) at a ratio (D1:D2) of the distances calculated by the unit (c25).

33. The apparatus of claim 30, further comprising:
(k) a unit for generating a polygonal line that approximates a trajectory of a moving object contained in video data or a trajectory of a motion of a screen view.

34. An apparatus for interactively manipulating video data, comprising the steps of:
(1) a unit for receiving input coordinates:
(m) a unit for sliding a coordinate indicator along a polygonal line formed by at least two segments using a polygonal line shaped slider composed of the polygonal line and the coordinate indicator according to input coordinates; and
(n) a unit for presenting the video data of an image frame corresponding to a position of the coordinate indicator, wherein the coordinate indicator is positioned at a nearest point on the polygonal line which is substantially nearest to the input coordinates.

35. The apparatus of claim 34, further comprising:
(o) a unit for generating a polygonal line that approximates a trajectory of a moving object contained in the video data or a trajectory of a motion of screen view.

36. A computer readable recording medium recording a program for causing a computer to execute processing for entering data corresponding to specified coordinates, the processing includes:
(a) a process for storing coordinates of vertexes which define a polygonal line shaped slider that is composed of a polygonal line formed by at least two segments and a coordinate indicator to be moved along the polygonal line;

(b) a process for storing input coordinates; and
(c) a process for mapping the input coordinates onto a nearest point on the polygonal line which is substantially nearest to the input coordinates and positioning the coordinate indicator at the nearest point.

37. The recording medium of claim 36, wherein the process (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtains an intersection point of the parallel line and each one of the two end lines of the selected segment, calculates distances between the input coordinates and obtained intersection points and obtains a ratio of the calculated distances, and positions the coordinate indicator at a point that internally divides the selected segment at a calculated ratio.

38. The recording medium of claim 36, wherein the process (c) includes the processes of:
(c21) a process for generating, for both vertexes (P1, P2) of each segment of the polygonal line, end lines (L1, L2) each of which is a bisector line of a vertex angle or a perpendicular line passing through a vertex;
(c22) a process for determining, for each of the vertexes (P1, P2), whether or not each one of the vertexes and the input coordinates are on same side of an end line passing through another one of the vertexes;
(c23) a process for calculating a distance between the input coordinates and each segment;
(c24) a process for selecting one segment (L3) which is nearest to the input coordinates from those segments which are determined by the process (c22) as having one vertex on the same side as the input coordinates of the end line passing through another vertex;
(c25) a process for generating a parallel line (L4) that is parallel to said one segment (L3) and passing through the input coordinates;
(c26) a process for finding intersection points (Q1, Q2) of the parallel line (L4) and the end lines (L1, L2) of said one segment (L3);
(c27) a process for calculating distances (D1, D2) between the input coordinates and the intersection points (Q1, Q2); and
(c28) a process for positioning the coordinate indicator at a point that internally divides said one segment (L3) at a ratio (D1:D2) of the distances calculated by the process (c25).

39. The recording medium of claim 36, wherein the processes further include:
(k) a process for generating a polygonal line that approximates a trajectory of a moving object contained in video data or a trajectory of a motion of a screen view.

40. A computer readable recording medium recording a program for causing a computer to execute processing for interactively manipulating video data, the processing including:
(l) a process for sliding a coordinate indicator along a polygonal line formed by at least two segments using a polygonal line shaped slider composed of the polygonal line and the coordinate indicator according to input coordinates; and
(m) a process for presenting the video data of an image frame corresponding to a position of the coordinate indicator, wherein the coordinate indicator is positioned at a nearest point on the polygonal line which is substantially nearest to the input coordinates.

41. The recording medium of claim 40, wherein the processes further include:
(n) a process for generating a polygonal line that approximates a trajectory of a moving object contained in the video data or a trajectory of a motion of a screen view.

42. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates; and
(c) mapping the input coordinates onto a point on the polygonal line and positioning the coordinate indicator at the point,
wherein the step (c) positions the position of an intersection point which is nearest to the input coordinates at a position of the coordinate indicator, the intersection point being selected from intersection points of each segment and a perpendicular line from the input coordinates to the each segment of the polygonal line.

43. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates; and
(c) mapping the input coordinates onto a point on the polygonal line and positioning the coordinate indicator at the point,
wherein the step (c) includes the steps of:
(c1) extending a perpendicular line from the input coordinates to each segment of the polygonal line;
(c2) finding an intersection point of the perpendicular line and each segment and calculating, for each segment, a ratio of a length of a partial segment divided by the intersection point with respect to a length of each segment;
(c3) calculating a distance between the input coordinates and each intersection point; and
(c4) selecting one of intersection points whose distance as obtained by the step (c3) is smallest among intersection points whose ratio as calculated by the step (c2) is within a range of 0 to 1.

44. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates; and
(c) mapping the input coordinates onto a point on the polygonal line and positioning the coordinate indicator at the point,
wherein the step (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, calculates a distance between the input coordinates and each one of the two end lines of a selected segment and calculates a ratio of calculated distances, and positions the coordinate indicator at a point that internally divides the selected segment at a calculated ratio.

45. A method of entering data corresponding to specified coordinates, comprising the steps of:

(a) storing coordinates of vertexes which define a polygonal line shaped slider that is composed of a polygonal line formed by at least one segment and a coordinate indicator to be moved along the polygonal line;

(b) storing input coordinates; and (c) mapping the input coordinates onto a point on the polygonal line and positioning the coordinate indicator at the point, wherein the step (c) includes the steps of:

(c11) generating, for both vertexes (P1, P2) of each segment of the polygonal line, end lines (L1, L2) each of which is a bisector line of a vertex angle or a perpendicular line passing through a vertex;

(c12) determining, for each of the vertexes (P1, P2), whether or not each one of the vertexes and the input coordinates are on same side of an end line passing through another one of the vertexes;

(c13) calculating a distance between the input coordinates and each segment;

(c14) selecting one segment (L3) which is nearest to the input coordinates from those segments which are determined by the step (c12) as having one vertex on the same side as the input coordinates of the end line passing through another vertex;

(c15) calculating distances (D1, D2) between the input coordinates and the end lines (L1, L2) passing through the vertexes of said one segment (L3) selected by the step (c14); and (c16) positioning the coordinate indicator at a point that internally divides said one segment (L3) at a ratio (D1:D2) of the distances calculated by the step (c15).

46. A method of entering data corresponding to specified coordinates, comprising the steps of:

(a) storing coordinates of vertexes which define a polygonal line shaped slider that is composed of a polygonal line formed by at least one segment and a coordinate indicator to be moved along the polygonal line;

(b) storing input coordinates; and (c) mapping the input coordinates onto a point on the polygonal line and positioning the coordinate indicator at the point, wherein the step (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtain an intersection point of the parallel line and each one of the two end lines of the selected segment, calculates distances between the input coordinates and obtained intersection points and obtains a ratio of calculated distance, and positions the coordinate indicator at a point that internally divides the selected segment at a calculated ratio.

47. A method of entering data corresponding to specified coordinates, comprising the steps of:

(a) storing coordinates of vertexes which define a polygonal line shaped slider that is composed of a polygonal line formed by at least one segment and a coordinate indicator to be moved along the polygonal line;

(b) storing input coordinates; and (c) mapping the input coordinates onto a point on the polygonal line and positioning the coordinate indicator at the point, wherein the step (c) includes the steps of:

(c21) generating, for both vertexes (P1, P2) of each of segment of the polygonal line, end lines (L1, L2) each of which is a bisector line of a vertex angle or a perpendicular line passing through a vertex;

(c22) determining, for each of the vertexes (P1, P2) whether or not each one of the vertexes and the input coordinates are on same side of an end line passing through another one of the vertexes;

(c23) calculating a distance between the input coordinates and each segment;

(c24) selecting one segment (L3) which is nearest to the input coordinates form those segments which are determined by the step (c22) as having one vertex on the same side as the input coordinates of the end line passing through another vertex;

(c25) generating a parallel line (L4) that is parallel to said one segment (L3) and passing through the input coordinates;

(c26) finding intersection points (Q1, Q2) of the parallel line (L4) and the end lines (L1, L2) of said one segment (L3);

(c27) calculating distances (D1, D2) between the input coordinates and the intersection points (Q1, Q2); and (c28) positioning the coordinate indicator at a point that internally divides said one segment (L3) at a ratio (D1:D2) of the distances calculated by the step (c15).

48. A method of entering data corresponding to specified coordinates, comprising the steps of:

(a) storing coordinates of vertexes which define a polygonal line shaped slider that is composed of a polygonal line formed by at least one segment and a coordinate indicator to be moved along the polygonal line;

(b) storing input coordinates; and (c) mapping the input coordinates onto a point on the polygonal line and positioning the coordinate indicator at the point, wherein the step (c) positions the position of an intersection point which is nearest to the input coordinates at a position of the coordinate indicator, the intersection point being selected from intersection points of each segment and a perpendicular line from the input coordinates to the each segment of the polygonal line, and when a position of the coordinate indicator is indeterminable, the step (c) positions the coordinate indicator at one of the vertexes of the polygonal line that is nearest to the input coordinates.

49. A method of entering data corresponding to specified coordinates, comprising the steps of:

(a) storing coordinates of vertexes which define a polygonal line shaped slider that is composed of a polygonal line formed by at least one segment and a coordinate indicator to be moved along the polygonal line;

(b) storing input coordinates; and (c) mapping the input coordinates onto a point on the polygonal line and positioning the coordinate indicator at the point; and (d) providing data corresponding to a position of the coordinate indicator,
wherein the step (d) includes the steps of:
(d1) storing data corresponding the vertexes of the polygonal line; and
(d2) acquiring data (V1, V2) corresponding to both vertexes of one segment on which the coordinate indicator is positioned, and calculating a ratio at which the position of the coordinate indicator internally divides said one segment; and
(d3) calculating data corresponding to the ratio calculated by the step (d2) according to acquired data (V1, V2), and providing calculated data.

50. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(e) selecting one polygonal line from a plurality of polygonal lines.

51. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(e) selecting one polygonal line from a plurality of polygonal lines,
wherein the step (e) selects one polygonal line containing a segment that is nearest to the input coordinates.

52. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(e) selecting one polygonal line from a plurality of polygonal lines,
wherein the step (e) selects one polygonal line having a coordinate indicator that is nearest to the input coordinates.

53. A method of entering data corresponding to specified coordinates, comprising the steps of:
(a) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(e) selecting one polygonal line from a plurality of polygonal lines; and
(f) storing, for each segment of each polygonal line, a flag indicating whether or not each polygonal line is switchable to another polygonal line at each segment,
wherein the step (e) refers to the flag of one segment of one polygonal line on which the coordinate indicator is positioned when determining whether or not said one polygonal line is to be switched to another polygonal line.

54. A method of entering data corresponding to specified coordinates, comprising the steps of:
(b) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(g) merging polygonal lines that share a vertex into one.

55. A method of entering data corresponding to specified coordinates, comprising the steps of:
(c) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(j) smoothing a shape of the polygonal line,
wherein the step (j) includes the steps of:
(j1) extracting a vertex whose vertex angle is smaller than a prescribed threshold ($\alpha$) from the vertexes of the polygonal line; and
(j2) dividing an extracted vertex into at least two vertexes each having a vertex angle greater than the threshold.

56. A method of entering data corresponding to specified coordinates, comprising the steps of:
(d) storing coordinates of vertexes which define a polygonal line shaped slider that is composed of a polygonal line formed by at least one segment and a coordinate indicator to be moved along the polygonal line;
(b) storing input coordinates;
(c) mapping the input coordinates onto a point on the polygonal line and positioning the coordinate indicator at the point; and
(j) smoothing a shape of the polygonal line,
wherein the step (6) includes the steps of:
(j11) extracting a pair of adjacent vertexes whose distance is shorter than a prescribed threshold (d) from the vertexes of the polygonal line; and
(j12) merging extracted vertexes into one vertex.

57. A method of interactively manipulating video data, comprising the steps of:
(l) sliding a coordinate indicator along a polygonal line formed by at least one segment using a polygonal line shaped slider composed of the polygonal line and the coordinate indicator according to input coordinates;

(m) presenting the video data of an image frame corresponding to a position of the coordinate indicator; and (n) presenting the polygonal line over the video data.

58. An apparatus for entering data corresponding to specified coordinates, comprising:

(a) a unit for storing coordinates of vertexes which define a polygonal line shaped slider that is composed of a polygonal line formed by at least one segment and a coordinate indicator to be moved along the polygonal line;

(b) a unit for storing input coordinates; and (c) a unit for mapping the input coordinates onto a point on the polygonal line and positioning the coordinate indicator at the point, wherein the unit (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtain an intersection point of the parallel line and each one of the two end lines of the selected segment, calculates distances between the input coordinates and obtained intersection points and obtains a ratio of calculated distance, and positions the coordinate indicator at a point that internally divides the selected segment at a calculated ratio.

59. An apparatus for entering data corresponding to specified coordinates, comprising:

(a) a unit for storing coordinates of vertexes which define a polygonal line shaped slider that is composed of a polygonal line formed by at least one segment and a coordinate indicator to be moved along the polygonal line;

(b) a unit for storing input coordinates; and (c) a unit for mapping the input coordinates onto a point on the polygonal line and positioning the coordinate indicator at the point, wherein the unit (c) includes:

(c21) a unit for generating, for both vertexes (P1, P2) of each segment of the polygonal line, end lines (L1, L2) each of which is a bisector line of a vertex angle or a perpendicular line passing through a vertex;

(c22) a unit for determining, for each of the vertexes (P1, P2) whether or not each one of the vertexes and the input coordinates are on same side of an end line passing through another one of the vertexes;

(c23) a unit for calculating a distance between the input coordinates and each segment;

(c24) a unit for selecting one segment (L3) which is nearest to the input coordinates form those segments which are determined by the unit (c22) as having one vertex on the same side as the input coordinates of the end line passing through another vertex;

(c25) a unit for generating a parallel line (L4) that is parallel to said one segment (L3) and passing through the input coordinates;

(c26) a unit for finding intersection points (Q1, Q2) of the parallel line (L4) and the end lines (L1, L2) of said one segment (L3);

(c27) a unit for calculating distances (D1, D2) between the input coordinates and the intersection points (Q1, Q2); and (c28) a unit for positioning the coordinate indicator at a point that internally divides said one segment (L3) at a ratio (D1:D2) of the distances calculated by the unit (c25).

60. A computer readable recording medium recording a program for causing a computer to execute processing for entering data corresponding to specified coordinates, the processing including:

(a) a process for storing coordinates of vertexes which define a polygonal line shaped slider that is composed of a polygonal line formed by at least one segment and a coordinate indicator to be moved along the polygonal line;

(b) a process for storing input coordinates; and (c) a process for mapping the input coordinates onto a point in the polygonal line and positioning the coordinate indicator at the point, wherein the process (c) generates, for each endpoint of each segment of the polygonal line, an end line which is either a bisector line of a vertex angle or a perpendicular line passing through each endpoint, selects a segment that has two end lines between which the input coordinates are located and that is nearest to the input coordinates, generates a parallel line that is parallel to a selected segment and passing through the input coordinates and obtain an intersection point of the parallel line and each one of the two end lines of the selected segment, calculates distances between the input coordinates and obtained intersection points and obtains a ratio of calculated distance, and positions the coordinate indicator at a point that internally divides the selected segment at a calculated ratio.

61. A computer readable recording medium recording a program for causing a computer to execute processing entering data corresponding to specified coordinates, the processing including:

(a) a process for storing coordinates of vertexes which define a polygonal line shaped slider that is composed of a polygonal line formed by at least one segment and a coordinate indicator to be moved along the polygonal line;

(b) a process for storing input coordinates; and (c) a process for mapping the input coordinates onto a point on the polygonal line and positioning the coordinate indicator at the point, wherein the process (c) includes:

(c21) a process for generating, for both vertexes (P1, P2) of each of segment of the polygonal line, end lines (L1, L2) each of which is a bisector line of a vertex angle or a perpendicular line passing through a vertex;

(c22) a process for determining, for each of the vertexes (P1, P2) whether or not each one of the vertexes and the input coordinates are on same side of an end line passing through another one of the vertexes;

(c23) a process for calculating a distance between the input coordinates and each segment;

(c24) a process for selecting one segment (L3) which is nearest to the input coordinates form those segments which are determined by the process (c22) as having one vertex on the same side as the input coordinates of the end line passing through another vertex;

(c25) a process for generating a parallel line (L4) that is parallel to said one segment (L3) and passing through the input coordinates;

(c26) a process for finding intersection points (Q1, Q2) of the parallel line (L4) and the end lines (L1, L2) of said one segment (L3);

(c27) a process for calculating distances (D1, D2) between the input coordinates and the intersection points (Q1, Q2); and (c28) a process for positioning the coordinate indicator at a point that internally divides said one segment (L3) at a ratio (D1:D2) of the distances calculated by the process (c25).

* * * * *